(12) United States Patent
Gavrilov et al.

(10) Patent No.: US 11,210,171 B2
(45) Date of Patent: Dec. 28, 2021

(54) APPARATUS, SYSTEMS, AND METHODS FOR BOOTING FROM A CHECKPOINT IMAGE

(71) Applicant: International Business Machines Corporation, Armonk, NY (US)

(72) Inventors: Constantine Gavrilov, Rishon Le-Zion (IL); Eli Koren, Shoham (IL)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 16/735,155

(22) Filed: Jan. 6, 2020

(65) Prior Publication Data

US 2021/0208970 A1   Jul. 8, 2021

(51) Int. Cl.
*G06F 11/14* (2006.01)

(52) U.S. Cl.
CPC ...... *G06F 11/1417* (2013.01); *G06F 11/1405* (2013.01); *G06F 11/1464* (2013.01); *G06F 11/1469* (2013.01); *G06F 2201/84* (2013.01)

(58) Field of Classification Search
CPC .. G06F 11/14; G06F 11/1417; G06F 11/1405; G06F 11/1464; G06F 11/1469
See application file for complete search history.

(56) References Cited

U.S. PATENT DOCUMENTS

| | | | |
|---|---|---|---|
| 5,968,173 A * | 10/1999 | Watts, Jr. | G06F 9/4401 713/2 |
| 6,526,447 B1 | 2/2003 | Giammaria | |
| 8,495,573 B2 | 7/2013 | Craft et al. | |
| 8,549,543 B2 | 10/2013 | Kharat et al. | |
| 8,578,144 B2 | 11/2013 | Bower, III et al. | |
| 9,183,089 B1 | 11/2015 | Havemose | |
| 9,235,595 B2 * | 1/2016 | Wang | G06F 16/1734 |
| 9,329,943 B2 * | 5/2016 | Teli | G06F 11/1469 |
| 9,372,761 B1 * | 6/2016 | Chai | G06F 11/1446 |
| 9,384,094 B2 * | 7/2016 | Teli | G06F 11/1417 |
| 9,524,215 B1 * | 12/2016 | Khandelwal | G06F 11/00 |
| 9,535,798 B1 | 1/2017 | Liguori | |
| 10,049,012 B1 * | 8/2018 | Chai | G06F 11/1458 |

(Continued)

OTHER PUBLICATIONS

Y. Kusakabe, "IVI Fast boot approach", Fujitsu Ten Limited, Jul. 13, 2016, pp. 1-27.

*Primary Examiner* — Kamini B Patel
(74) *Attorney, Agent, or Firm* — Kunzler Bean & Adamson

(57) ABSTRACT

Methods that can boot a target computing device and/or target computing system from a checkpoint image for the target computing device and/or target computing system generated at a source computing system are disclosed herein. One method includes generating, by a processor on a source computing system, a checkpoint image for a target computing device and distributing the checkpoint image from the source computing system to the target computing device. Here, the checkpoint image is stored in the host computing system and is configured to enable the target computing device to restore itself from the checkpoint image and the source computing system and the target computing device are separate computing entities. Apparatus, systems, and computer program products that can include, perform, and/or implement the methods are also disclosed herein.

20 Claims, 21 Drawing Sheets

(56) References Cited

U.S. PATENT DOCUMENTS

| | | | |
|---|---|---|---|
| 2011/0072430 A1* | 3/2011 | Mani | G06F 11/1441 |
| | | | 718/1 |
| 2012/0036346 A1* | 2/2012 | Bower, III | G06F 9/4401 |
| | | | 713/2 |
| 2012/0144182 A1* | 6/2012 | Nam | G06F 9/4406 |
| | | | 713/2 |
| 2014/0195791 A1* | 7/2014 | Teli | G06F 11/1417 |
| | | | 713/2 |
| 2014/0195848 A1* | 7/2014 | Teli | G06F 11/1417 |
| | | | 714/15 |
| 2014/0281451 A1* | 9/2014 | Friedman | G06F 11/1417 |
| | | | 713/2 |
| 2014/0281452 A1* | 9/2014 | Friedman | G06F 11/1417 |
| | | | 713/2 |
| 2015/0006487 A1 | 1/2015 | Yang et al. | |
| 2016/0299774 A1 | 10/2016 | Reuther | |
| 2020/0026603 A1* | 1/2020 | Harwood | G06F 11/1464 |

* cited by examiner

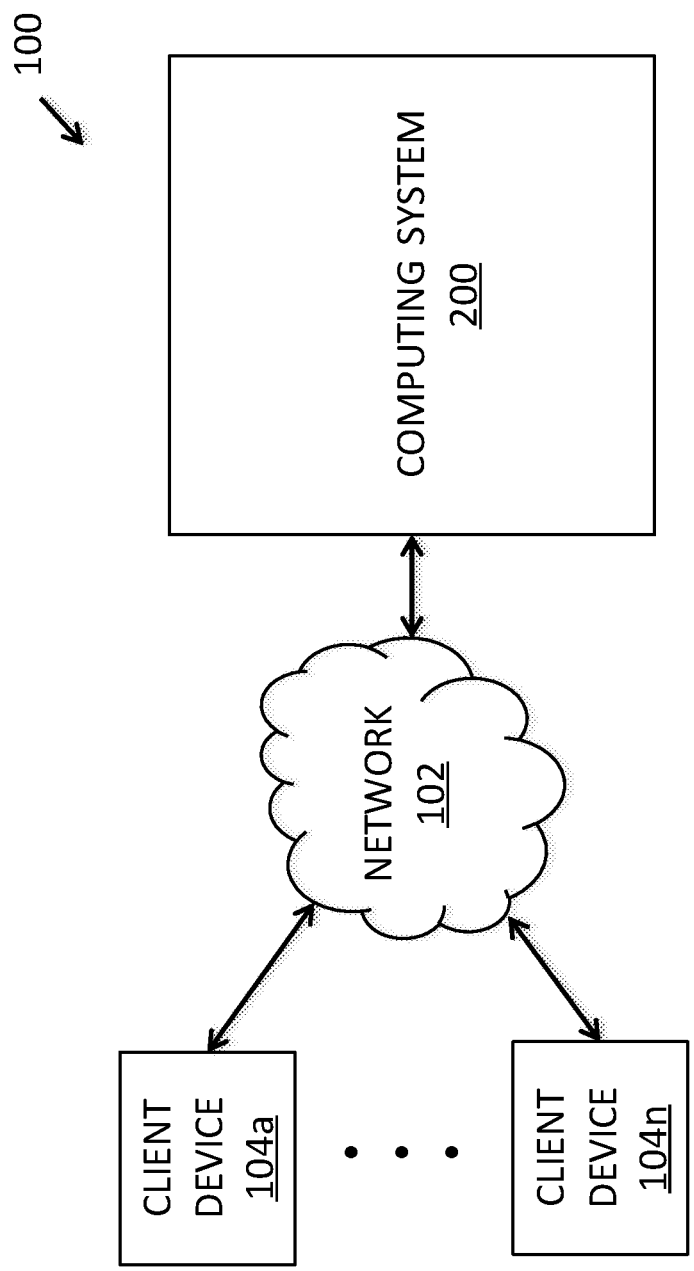

APPARATUS, SYSTEMS, AND METHODS FOR BOOTING FROM A CHECKPOINT IMAGE

FIELD

The subject matter disclosed herein relates to computing systems and, more particularly, relates to apparatus, systems, and methods that can boot a computing system/device from a checkpoint image.

BACKGROUND

Computing systems and/or devices typically use a boot process or reboot process upon start or restart, respectively. The complexity of hardware and/or software in at least some conventional computing systems and/or devices may require a significant time to process the microcode during boot operations that start kernel and/or other application services. Some challenges that may increase the processing time during boot operations can include: the operating system kernel needs to detect and enumerate all present hardware and load all necessary device drivers, multiple applications need to start a large number of threads, applications need to attach to large amounts of RAM and initialize the RAM, which requires allocation of memory and creating page tables, each application thread typically needs to create a number of hardware device contexts for its own use (e.g., for most hardware devices (e.g., fiber channel, Ethernet, Infiniband, compression accelerator, deduplication accelerator, etc.), and/or the creation or destroy path involves a slow flow within the hardware devices, etc., among other time consuming boot operations. While creating multiple objects (e.g., file handles, sockets, locks, message queues, event descriptors, etc.), some systems use lower end processors for power consumption and use various hardware accelerators for services they provide, and/or many processors may be "slow" for the many tasks and/or operations that the application threads need to perform before they are ready to provide services, etc., among other time consuming boot operations. Thus, at least some conventional computing systems and/or devices take a longer amount of time to perform boot operations than they otherwise could.

BRIEF SUMMARY

Apparatus, systems, and methods that can boot a target computing device and/or target computing system from a checkpoint image for the target computing device and/or target computing system generated at a source computing system are disclosed herein. One apparatus includes a checkpoint image module that generates a checkpoint image for a target computing device and a distribution module that transmits the checkpoint image to the target computing device. In various embodiments, the checkpoint image is generated and stored on a source computing system and is configured to enable the target computing device to restore itself from the checkpoint image. In additional or alternative embodiments, at least a portion of the checkpoint module and/or the boot module includes one or more of a set of hardware circuits, a set of programmable hardware devices, and/or executable code stored on a set of non-transitory computer-readable storage media.

One method includes generating, by a processor on a source computing system, a checkpoint image for a target computing device and distributing the checkpoint image from the source computing system to the target computing device. In various embodiments, the checkpoint image is stored on the source computing system and is configured to enable the target computing device to restore itself from the checkpoint image and the source computing system and the target computing device are separate computing entities.

One computer program product includes a computer-readable storage medium including program instructions embodied therewith. The program instructions are executable by a processor to cause the processor to generate, on a source computing system, a checkpoint image for a target computing device and distributing the checkpoint image from the source computing system to the target computing device. In various embodiments, the checkpoint image is stored on the source computing system and is configured to enable the target computing device to restore itself from the checkpoint image and the source computing system and the target computing device are separate computing entities.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which:

FIG. 1 is a block diagram of one embodiment of a computing network (or computing system) for generating, at a source computing system/device, a checkpoint image for booting a set of target computing systems and/or target computing devices;

DETAILED DESCRIPTION

Figure 2A:
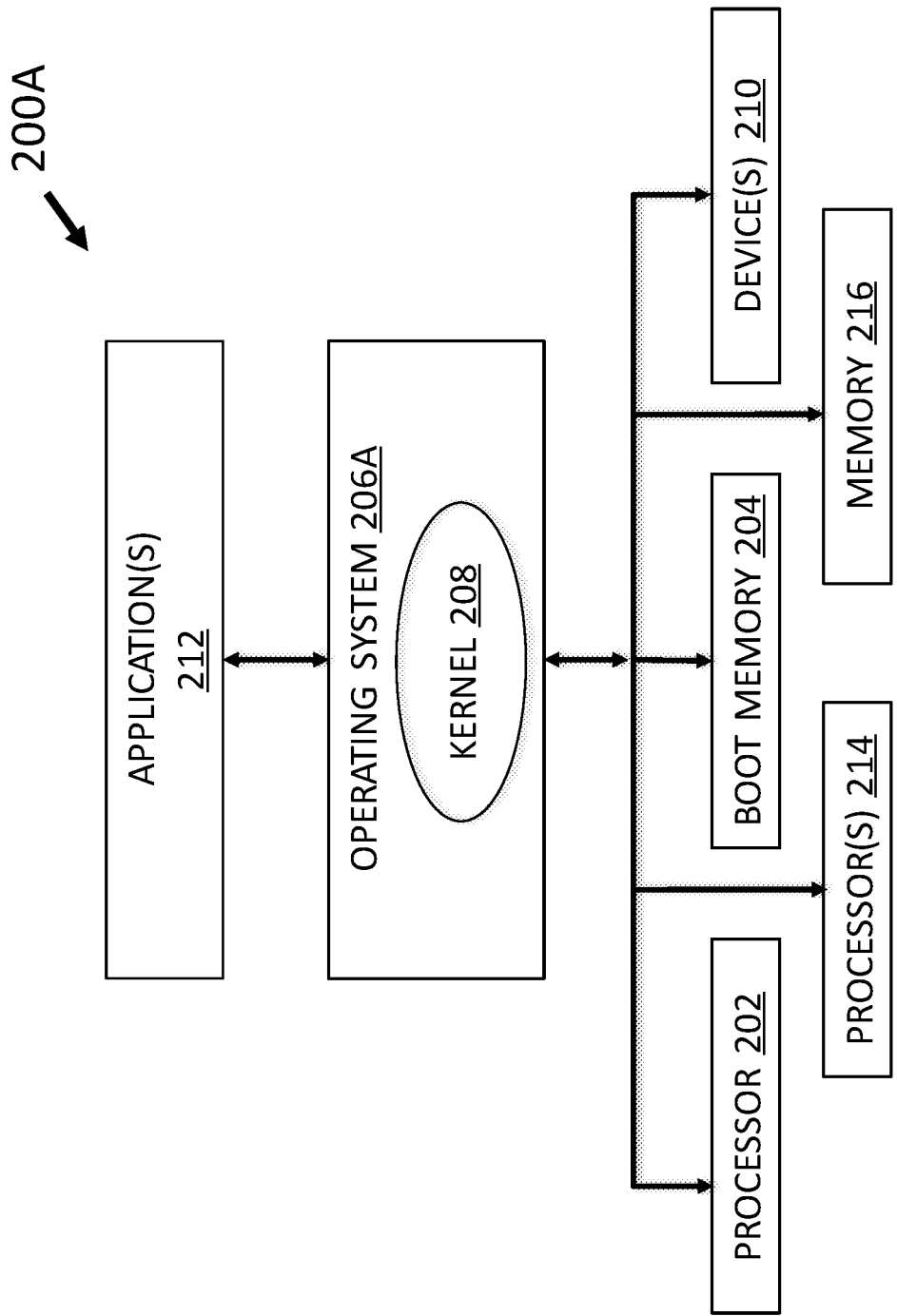
FIGS. 2A through 2C are block diagrams of various embodiments of a source computing system (or source computing device) for generating and distributing a checkpoint image included in the computing network of FIG. 1.

Disclosed herein are various embodiments providing apparatus, systems, methods, and computer program products that can reboot a computing system and/or computing device from a checkpoint image. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a volatile or non-volatile random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1 is a block diagram of one embodiment of a computing network 100 (or system) for booting one or more target devices and/or target systems from a checkpoint image generated at a source computing system and/or source computing device and distributed to the target device(s) and/or target system(s). At least in the illustrated embodiment, the computing network 100 includes a network 102 connecting a computing system 200 and a set of client devices 104*a* through 104*n*. The network 102 may be any suitable wired and/or wireless network 102 (e.g., public and/or private computer networks in any number and/or configuration (e.g., the Internet, an intranet, a cloud network, etc.)) that is known or developed in the future that enables the set of storage devices 104*a* through 104*n* and the computing system 200 to be coupled to and/or in communication with one another and/or to share resources. In various embodiments, the network 102 can include a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources that are possible and contemplated herein.

A computing system 200 may include any suitable hardware and/or software capable of performing computer processes, functions, and/or algorithms, as discussed elsewhere herein. In various embodiments, a computing system 200 may include any suitable computing system and/or computing device that can generate one or more checkpoint images and distribute the generated checkpoint image(s) to the set of client devices 104 (e.g., one or more client devices 104) so that the client device(s) 104 can boot from the distributed checkpoint image(s). A client device 104 can receive a distributed checkpoint image and boot from the checkpoint image after performing a system upgrade and/or debug dump. In some embodiments, the computing system 200 includes hardware and/or software configured to execute instructions in one or more modules and/or applications for generating one or more checkpoint images and distributing the checkpoint image(s) to one or more client devices 104, as discussed elsewhere herein.

Client devices 104*a* through 104*n* can be any suitable computing hardware and/or software (e.g., a thick client, a thin client, or hybrid thereof) capable of accessing the computing system 200 via the network 102. In general, the computing system 200 can be accessed by the client device(s) 104*a* through 104*n* and/or communication with the computing system 200 can be initiated by the client device(s) 104 through a network socket (not shown) utilizing one or more inter-process networking techniques.

Client devices 104*a* through 104*n* (e.g., a target device and/or target system) can receive a distributed checkpoint image from a computer system 200 (e.g., a source system and/or source device) and boot and/or restore itself from the checkpoint image after performing a system upgrade and/or debug dump. In some embodiments, each of client devices 104*a* through 104*n* includes hardware and/or software configured to execute instructions in one or more modules and/or applications for booting itself from a distributed checkpoint image after performing a system upgrade and/or debug dump, as discussed elsewhere herein.

While the computing network 100 illustrated in FIG. 1 includes two (2) client devices (e.g., client devices 104A and 104*n*), the various embodiments of the computing network 100 are not limited to two client devices. That is, a computing network 100 may include one (1) client device or a quantity of client devices that is greater than two client devices. In other words, various other embodiments of the computing network 100 may include any suitable of quantity of client devices.

Referring to FIG. 2A, FIG. 2A is a block diagram of one embodiment of a computing system 200A ((e.g., a source computing system) or computing device 200A (e.g., a source computing device)) that can generate one or more checkpoint images and distribute the generated checkpoint image(s) to one or more target computing devices (e.g., client device(s) 104). At least in the illustrated embodiment, the computing system 200A includes, among other components, a processor 202, a boot memory 204, an operating system 206A including a kernel 208, a set of devices 210, a set of applications 212, a set of processors 214, and a set of memory 216.

Figure 2B:
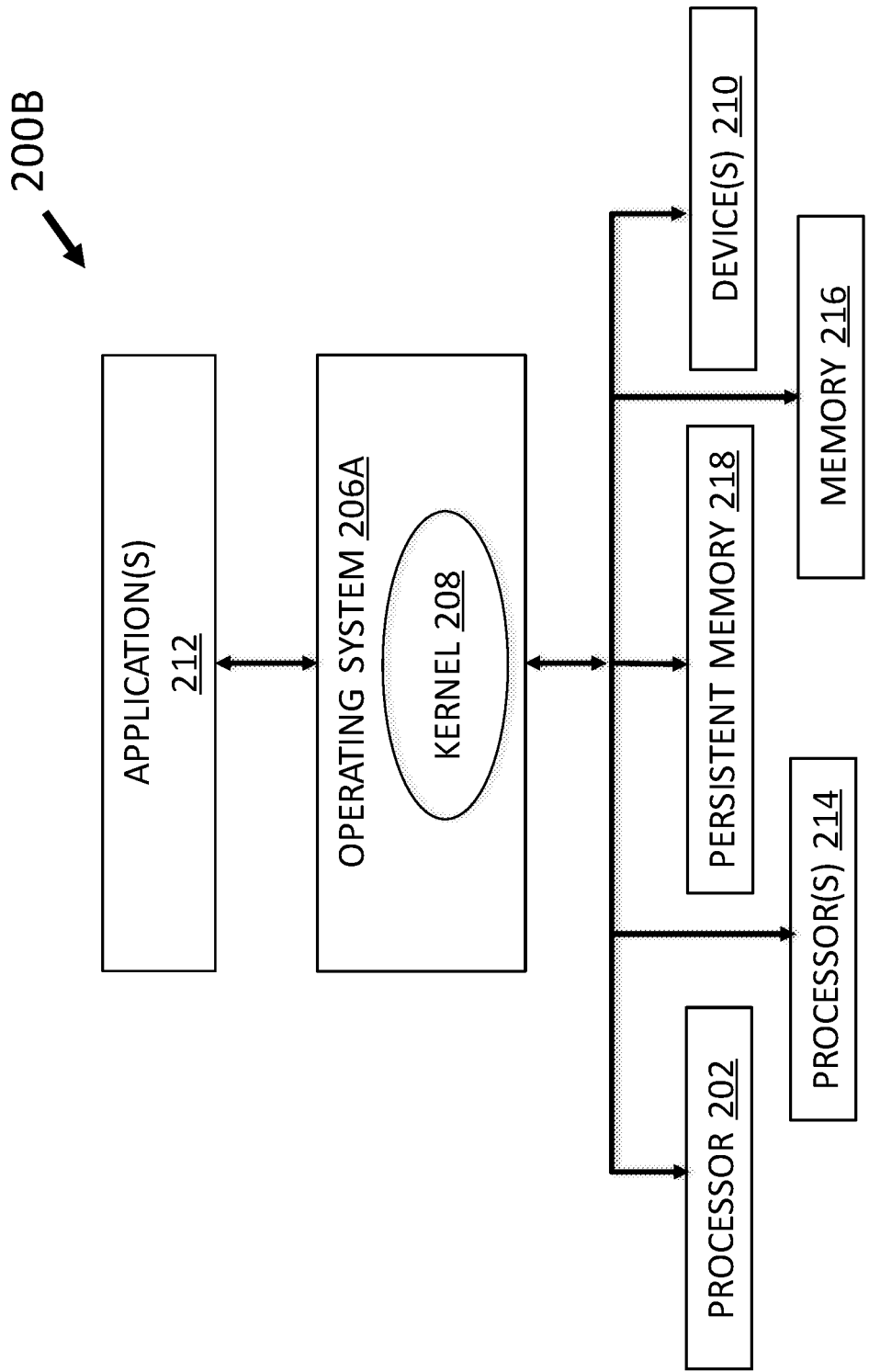

With reference to FIG. 2B, FIG. 2B is a block diagram of one embodiment of a computing system 200B ((e.g., a source computing system) or computing device 200B (e.g., a source computing device)) that can generate one or more checkpoint images and distribute the generated checkpoint image(s) to one or more target computing devices (e.g., client device(s) 104). At least in the illustrated embodiment, the computing system 200B includes, among other components, a processor 202, a persistent memory 218, an operating system 206A including a kernel 208, a set of devices 210, a set of applications 212, a set of processors 214, and a set of memory 216.

Figure 2C:
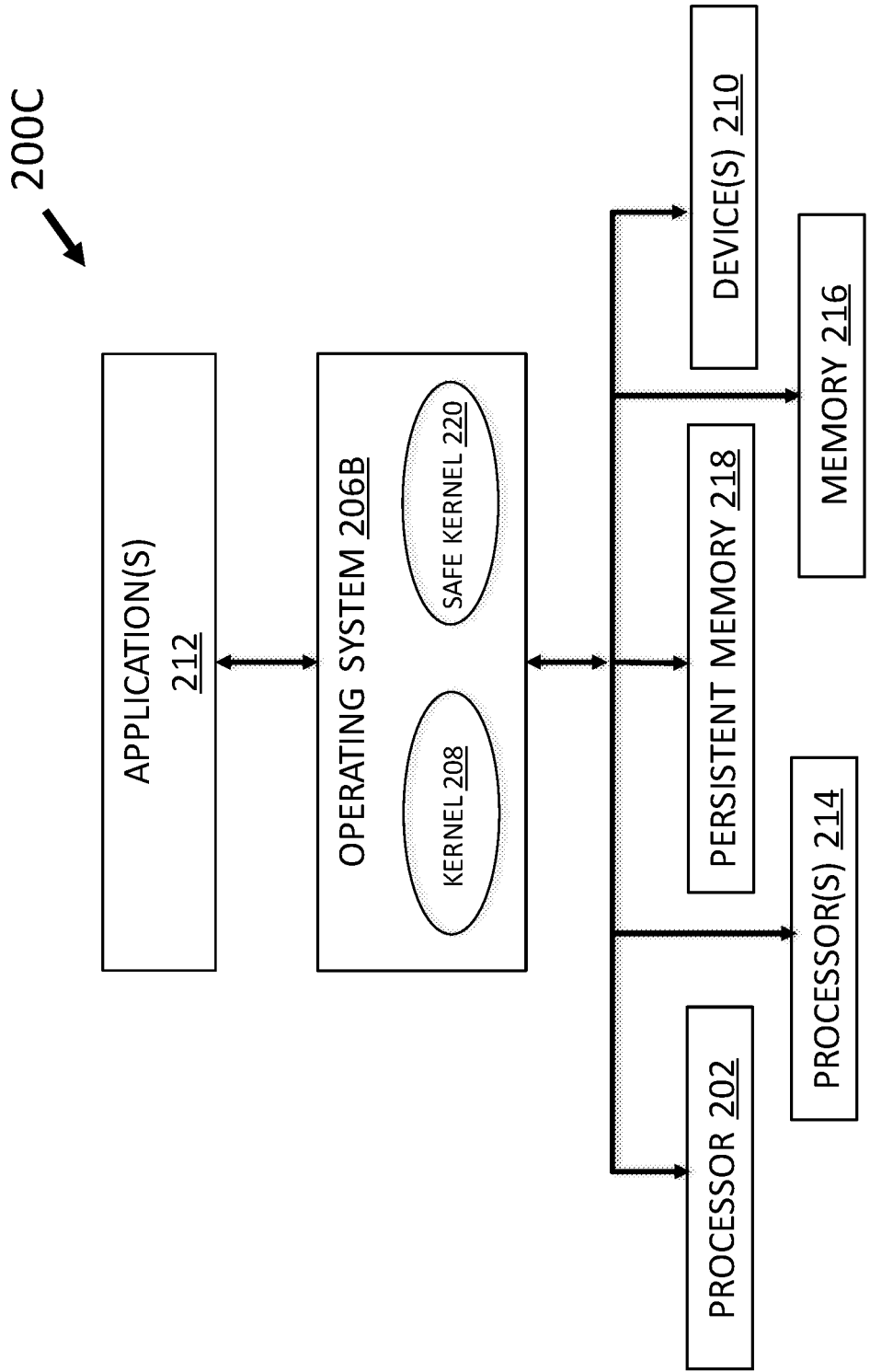

With reference to FIG. 2C, FIG. 2C is a block diagram of one embodiment of a computing system 200C ((e.g., a source computing system) or computing device 200C (e.g., a source computing device)) that can generate one or more checkpoint images and distribute the generated checkpoint image(s) to one or more target computing devices (e.g., client device(s) 104). At least in the illustrated embodiment, the computing system 200C includes, among other components, a processor 202, a persistent memory 218, an operating system 206B including a kernel 208 and a safe kernel 220, a set of devices 210, a set of applications 212, a set of processors 214, and a set of memory 216.

A processor 202 may include any suitable non-volatile/persistent hardware and/or software configured to read, write, and/or analyze data. In various embodiments, a processor 202 may further include hardware and/or software for executing instructions in one or more modules and/or applications that can generate a checkpoint image and distribute the generated checkpoint image to a set of target devices (e.g., client device(s) 104) so that the target device(s) can boot and/or restore itself or themselves from the generated checkpoint image.

Figure 3:
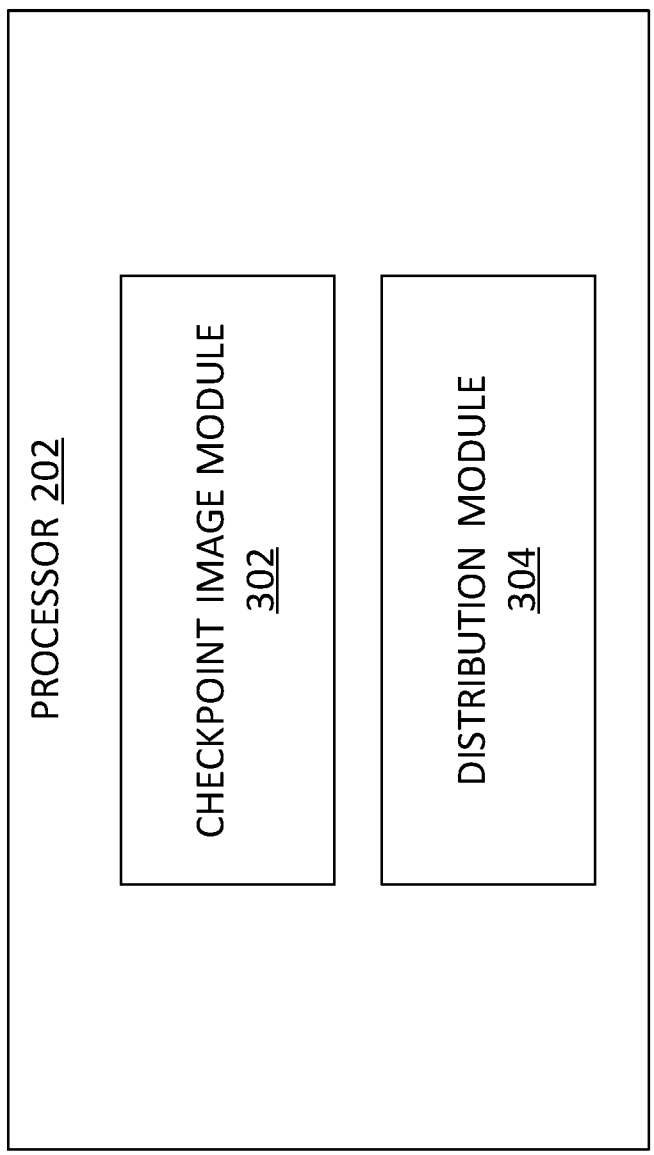
FIG. 3 is a block diagram of one embodiment of a processor included in the source computing systems of FIGS. 2A through 2C.

Referring to FIG. 3, FIG. 3 is a block diagram of one embodiment of a processor 202 that can be included in a computing device 200A, 200B, or 200C (also simply referred individually, in various groups, or collectively as computing device(s) 200). At least in the illustrated embodiment, a processor 202 includes, among other components, a checkpoint image module 302 and a distribution module 304.

A checkpoint image module 302 may include any suitable hardware and/or software that can generate a checkpoint image of a computing system 200 for distribution to one or more client devices 104 (e.g., one or more target devices). In various embodiments, the checkpoint image includes an image of a kernel 208 and/or one or more applications 212 that have been started.

In some embodiments, a checkpoint image includes the booted kernel 208, the started application(s) 212, and/or one or more devices 210 in their initialized state. Examples of a checkpoint image can include, but are not limited to, the following: a checkpoint image containing memory 216 allocated by the application(s) 212, a checkpoint image containing memory 216 initialized by the application(s) 212, a checkpoint image containing name space objects (e.g., shared memory, semaphores message queues, etc.) created by the application(s) 212, a checkpoint image containing a set of initialized threads and/or objects for thread communications created by the application(s) 212, a checkpoint image containing one or more created kernel objects that represent hardware contexts for device(s) 210 and a driver for a device 210 including checkpoint microcode support, and/or a checkpoint image containing the application(s) 212 and/or device(s) 210 in a stopped state (e.g., a paused state, a sleep state, and/or a hibernate state).

Figure 4A:
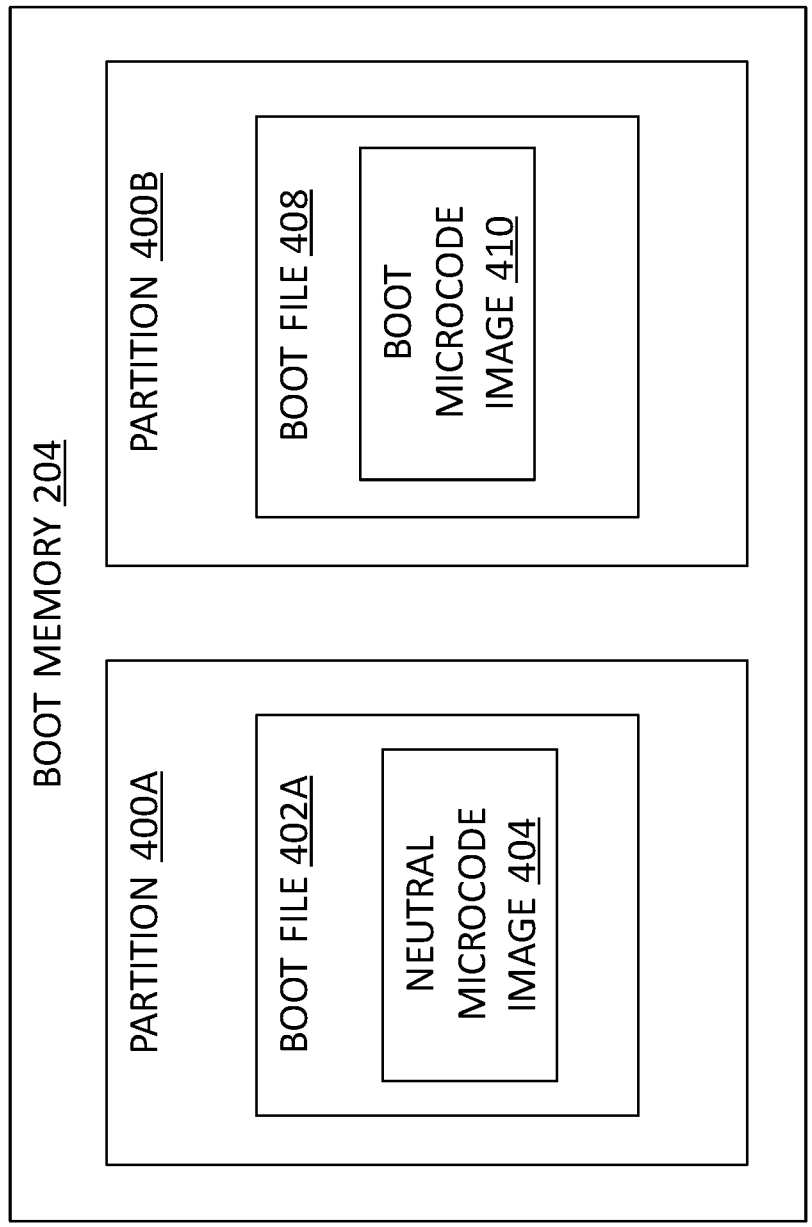
FIG. 4A is a block diagram of one embodiment of a boot memory included in the source computing system of FIG. 2A.

In some embodiments, the checkpoint image includes a neutral microcode image 404 (see FIG. 4A). A neutral microcode image 404 can include any suitable predetermined initialized state for the kernel 208, the started application(s) 212, and/or the thread(s) corresponding to the kernel 208, the application(s) 212, and/or the device(s) 210. In various embodiments, a neutral microcode image 404 includes a checkpoint state of the kernel 208, the started application(s) 212, and/or the thread(s) corresponding to the kernel 208, the application(s) 212, and/or the device(s) 210 that reflect a stateless stage of the boot process. A stateless stage for the kernel 208, the started application(s) 212, and/or started thread(s) reflects the microcode execution path that will be executed each time the boot process takes place, without dependency on a specific product unit, its previous state, or its current state. For example, a stateless stage for a storage product may include starting (or loading to memory) all storage services (interface adapters and drivers, cache and data reduction services) and performing initialization tasks that do not depend on a specific unit or its history. This may include initialization of hardware adapters, creation of threads and objects required for threads communication (locks, queues, event channels), allocating of various memory objects, etc. This stage cannot include operations that are specific to the specific unit or its history, like configuring network or interface IDs and addresses, examining existing storage or its cache, or looking at pending transactions that have accumulated during reboot process.

Figure 4B:
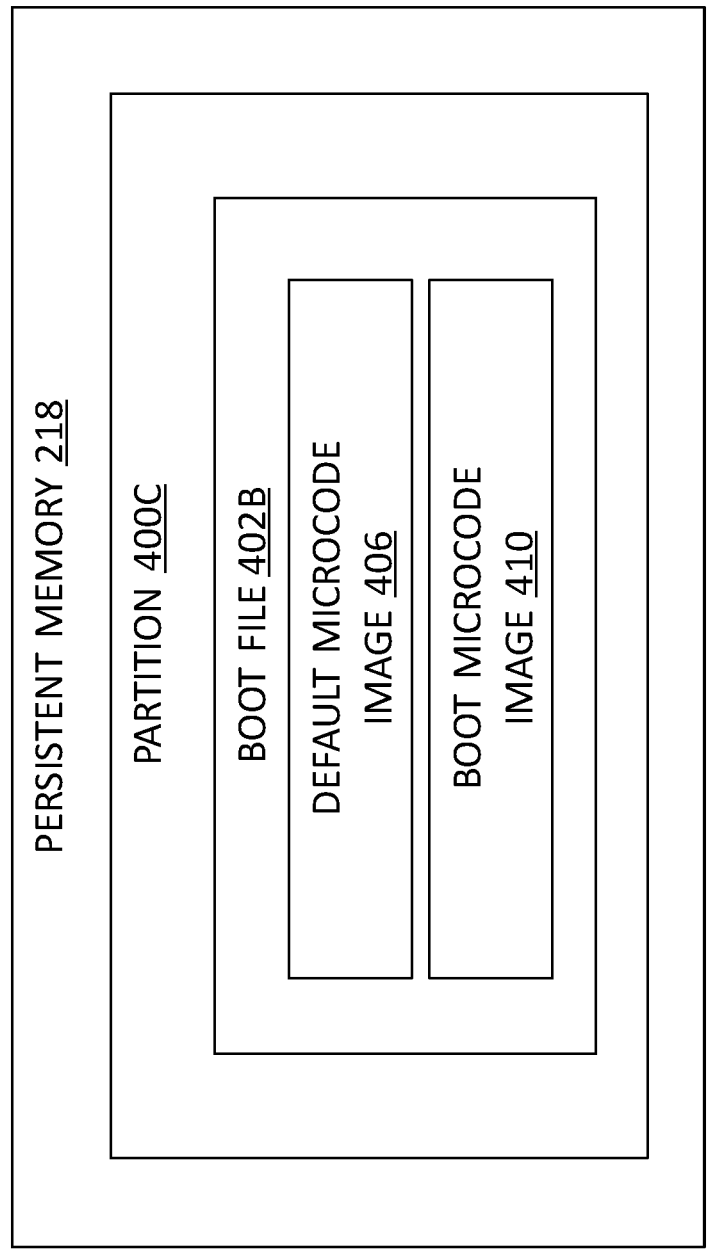
FIG. 4B is a block diagram of one embodiment of a persistent memory included in the source computing systems of FIGS. 2B and 2C.

In additional or alternative embodiments, the checkpoint image includes a default microcode image 406 (see FIG. 4B). A default microcode image 406 can include any suitable predetermined initialized state for the kernel 208, the started application(s) 212, and/or the thread(s) corresponding to the kernel 208, the application(s) 212, and/or the device(s) 210. In various embodiments, a default microcode image 406 includes a checkpoint state for the kernel 208, the started application(s) 212, and/or the thread(s) corresponding to the kernel 208, the application(s) 212, and/or the device(s) 210 that reflect a stateful default boot state for a specific unit. A stateful boot state for the kernel 208 and/or the started application(s) 212 can include, in addition to a stateless stage, reaching a stage, in which network addresses or Interface IDs are configured, and storage, storage cache and storage services are initialized to a default state. Default images can be used for boot after a "clean" shutdown, for boot to rescue or service modes, or to reboot to a mode with safe factory settings.

In various embodiments, the checkpoint image module 302 generates a boot file 402A (see FIG. 4A) and/or a boot file 402B (see FIG. 4B) for the checkpoint image (also simply referred to individually, in various groups, or collectively as boot file(s) 402). A boot file 402 may include any suitable type of file that is known or developed in the future that can store a checkpoint image and allow the checkpoint image to be loaded from the boot file 402, which can stored on a boot drive of a target device (e.g., client device(s) 104), as discussed elsewhere herein.

In additional or alternative embodiments, a checkpoint image module 302 is configured to generate a checkpoint image (e.g., a neutral microcode image 404 and/or a default microcode image 404) by loading a kernel 208 and instructing a set of applications 212 to start an initialization mode (e.g., due to a system wide flag). In the initialization mode, the application(s) 212 perform one or more operations to initialize memory 216 (e.g., attach to persistent memory and/or allocate non-persistent memory), create threads, open or create one or more kernel namespace objects (e.g., shared memory, locks, message queues, pipes, file objects, sockets), and initialize non-persistent data structures. In various embodiments, persistent data structures are not initialized. The application(s) 212 are also instructed to open one or more devices 210 (e.g., hardware devices) and create device objects for the device(s) 210 that support a hibernation and resume procedure, as discussed elsewhere herein. The checkpoint image module 302 may also instruct the application(s) 212 to do an affinity setup to its thread(s) and/or interrupt(s). Upon completing the initialization operations, the application(s) 212 stop and/or pause operations.

A distribution module 304 may include any suitable hardware and/or software that can distribute a checkpoint image generated by the checkpoint image module 304. In various embodiments, the distribution module 304 is configured to distribute the generated checkpoint image(s) to one or more client devices 104 (e.g., one or more target device(s)). That is, the distribution module 304 is configured to distribute a generated checkpoint image to all of the client devices 104 or a specified and/or selected subset of the client devices 104.

With reference to FIGS. 2A and 4A, a boot memory 204 may include any suitable type of device and/or system that is known or developed in the future that can store computer-useable data. In various embodiments, a boot memory 204 includes a storage device/system including a set of non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 202). In some embodiments, the boot memory 204 includes one or more hard drives or hard disk drives.

A boot memory 204 may include any suitable size that can provide storage space for one or more boot files 402A, one or more checkpoint images (e.g., neutral microcode image(s) 404), one or more boot files 408, and/or one or more boot microcode images 410. Further, a boot memory 204 can store data in a set of data blocks, data segments, and/or data chunks including any suitable size that is known or developed in the future.

A boot memory 204, in various embodiments, may be configured to include a set of partitions, regions, and/or sections, which can include any suitable quantity of partitions, regions, and/or sections. As illustrated in FIG. 4A, a boot memory 204 can include two (2) partitions (e.g., partition 400A and partition 400B, also simply referred individually, in various groups, or collectively as partition(s) 400), among other quantities of partitions 400 that are greater than two partitions 400 and less than two partitions 400 (e.g., one (1) partition 400).

A partition 400A is configured to store one or more boot files 402A that can include/store one or more checkpoint images (e.g., neutral microcode image(s) 404), as discussed elsewhere herein. A partition 400B is configured to store one or more boot files 408 that can include/store one or more boot microcode images 410.

A boot file 408 may include any suitable type of file that can store/include computer-useable data. In various embodiments, a boot file 408 is configured to store/include one or more boot microcode images 410.

A boot microcode image 410 may include any suitable data that can be utilized to boot a computing system 200. In various embodiments, a boot microcode image 410 may include any suitable boot data, boot process, boot method, and/or boot procedure that is known or developed in the future that can perform a cold boot on a computing system 200.

Referring to FIGS. 2B, 2C, and 4B, a persistent memory 218 may include any suitable type of device and/or system that is known or developed in the future that can store computer-useable data. In various embodiments, a persistent memory 218 includes a storage device/system including a set of non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 202). In some embodiments, the persistent memory 218 includes one or more persistent RAM technologies (e.g., Intel Optane DC memory, etc.). In other embodiments, persistent memory 218 can include one or more hard drives or hard disk drives.

A persistent memory 218 may include any suitable size that can provide storage space for one or more boot files 402B, one or more checkpoint images (e.g., default microcode image(s) 406), and/or a boot microcode image 410. Further, a persistent memory 218 can store data in a set of data blocks, data segments, and/or data chunks including any suitable size that is known or developed in the future.

In various embodiments, a persistent memory 218 is configured to store data for a specific/particular device and/or system that is maintained and/or may never be deleted. Further, the data for the specific/particular device and/or system, in some embodiments, is excluded from the checkpoint image(s) generated by the checkpoint image module 302.

A persistent memory 218, in various embodiments, may be configured to include a set of partitions, regions, and/or sections, which can include any suitable quantity of partitions, regions, and/or sections. As illustrated in FIG. 4B, a persistent memory 218 can include one partition (e.g., partition 400C), among other quantities of partitions 400C that are greater than one partition 400C.

A partition 400C is configured to store one or more boot files 402B that can include/store one or more checkpoint images. At least in the illustrated embodiments, a boot file 402B is configured to store one or more default microcode image(s) 406 and/or a boot microcode image 410, as discussed elsewhere herein. In various embodiments, because persistent memory 218 may include a single partition 400C, during various operations (e.g., reboot, debug dump, etc.) the boot microcode image 410 may be flushed from the partition 400C and the computing device 200 is rebooted utilizing a default microcode image 406 stored in the partition 400C.

With reference to FIGS. 2A and 2B, an operating system 206A may include any suitable hardware and/or software that can support a set of functions/operations for a computing system 200. Example functions/operations can include, but are not limited to, scheduling tasks, executing applications, and/or controlling peripherals, etc., among other functions/operations that are possible and contemplated herein. As such, an operating system 206A may include any operating system that is known or developed in the future.

At least in the illustrated embodiment, an operating system 206A includes, among other components, a kernel 208 configured to boot a computing system 200. A kernel 208 may include any suitable hardware and/or software that can allocate resources, manage a set of files, and/or provide security for a computing system 200, among other functions/operations that are possible and contemplated herein.

In various embodiments, a kernel 208 is configured to operate/function in conjunction with a processor 202 to perform and/or facilitate performing the various operations of the processor 202, as discussed herein. That is, a kernel 208 may be configured to perform and/or assist in performing one or more procedure, operations, and/or methods for booting a computing device 200 from a checkpoint image (e.g., a neutral microcode image and/or a default microcode image), as discussed elsewhere herein, among other boot operations that are possible and contemplated herein.

Referring to FIG. 2C, an operating system 206B may include a kernel 208 similar to the various embodiments of a kernel 208 discussed elsewhere herein. An operating system 206B may further include, among other components, a safe kernel 220.

A safe kernel 220 may include any suitable hardware and/or software that can boot a computing system 200 in a safe mode. In various embodiments, a safe kernel 220 is configured to perform and/or facilitate performing a debug dump process, as discussed elsewhere herein. That is, a safe kernel 220 can be configured to save a checkpoint image (e.g., a boot file 502B and/or a default microcode image 506) and/or selected contents of the memory 216 (e.g., persistent memory) to a dump partition in the memory 216, as discussed elsewhere herein.

With reference again to FIGS. 2A, 2B, and 2C, a set of devices 210 may include any suitable computing device and/or system that can operate and/or perform one or more functions within the computing system 200. As such, a device 200 may include any computing device/system that is known or developed in the future. Further, a set of devices 210 may include any suitable quantity of devices 210 that can facilitate the computing system 200 performing its intended use.

A set of applications 212 may include any suitable computing application that can operate within the computing system 200. As such, an application 212 may include any hardware and/or software that is known or developed in the future. Further, a set of applications 212 may include any suitable quantity of applications 212 that can facilitate the computing system 200 and/or device(s) 210 performing their intended functions.

A set of processors 214 may include any suitable computer processing device that can operate within the computing system 200. As such, a processor 214 may include any hardware and/or software that is known or developed in the future. Further, a set of processors 214 may include any suitable quantity of processors 214 that can facilitate the computing system 200, device(s) 210, and/or application(s) 212 performing their intended functions.

A memory 216 may include any suitable type of device(s) and/or system(s) that is/are known or developed in the future that can store computer-usable data. In various embodiments, a memory 216 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 202 and/or processor(s) 214).

In some embodiments, a memory 216 may be implemented as a direct-access storage device (DASD). A memory 216, in further embodiments, may include other types of non-transitory memory such as, for example, flash memory (e.g., a solid-state devices (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) of memory devices (e.g., non-volatile and/or persistent), etc. that are possible and contemplated herein.

A memory 216 may include any suitable size that can provide storage space for one or more applications 212. A memory 216, in various embodiments, can include a size in the range of about four kilobytes (4 KB) to about one hundred terabytes (100 TB), among other sizes that are possible and contemplated herein. In some embodiments, a memory 216 can include a size of about one terabyte (1 TB), among other sizes that are possible and contemplated herein.

Figure 5A:
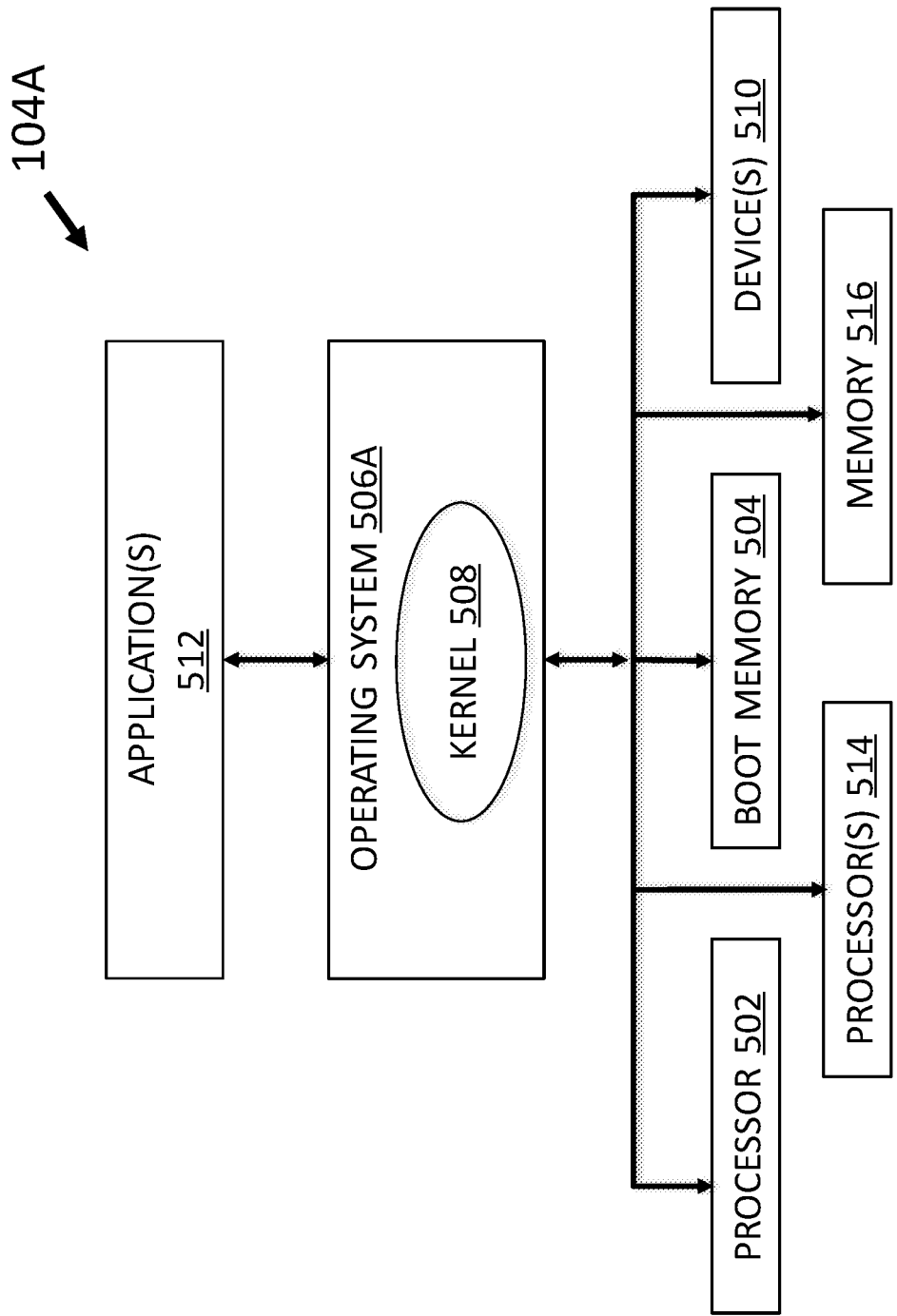
FIGS. 5A through 5C are block diagrams of various embodiments of a target computing device (or target computing system) included in the computing network of FIG. 1 that can boot and/or restore itself from a checkpoint image.
Figure 5B:
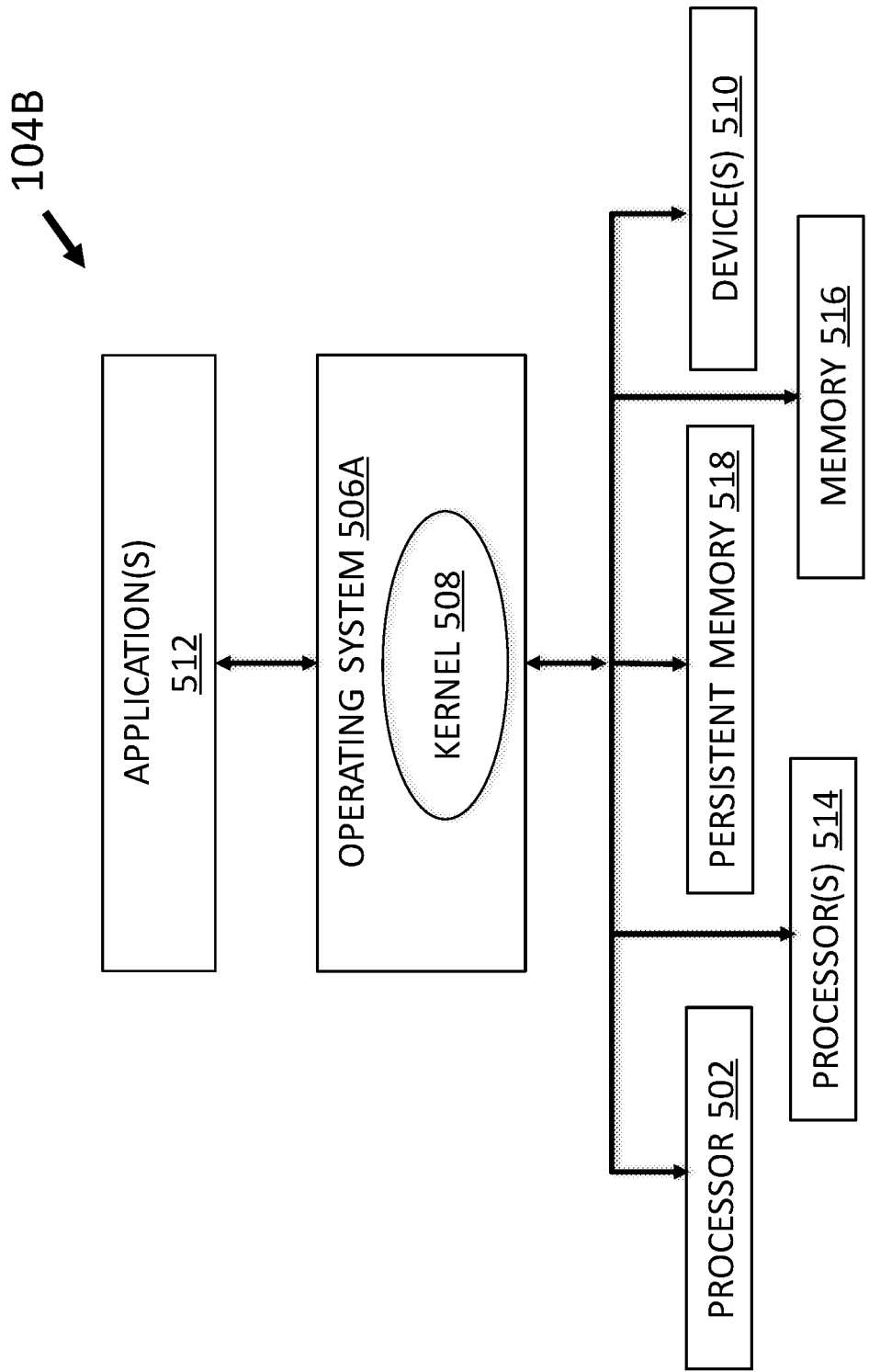
Figure 5C:
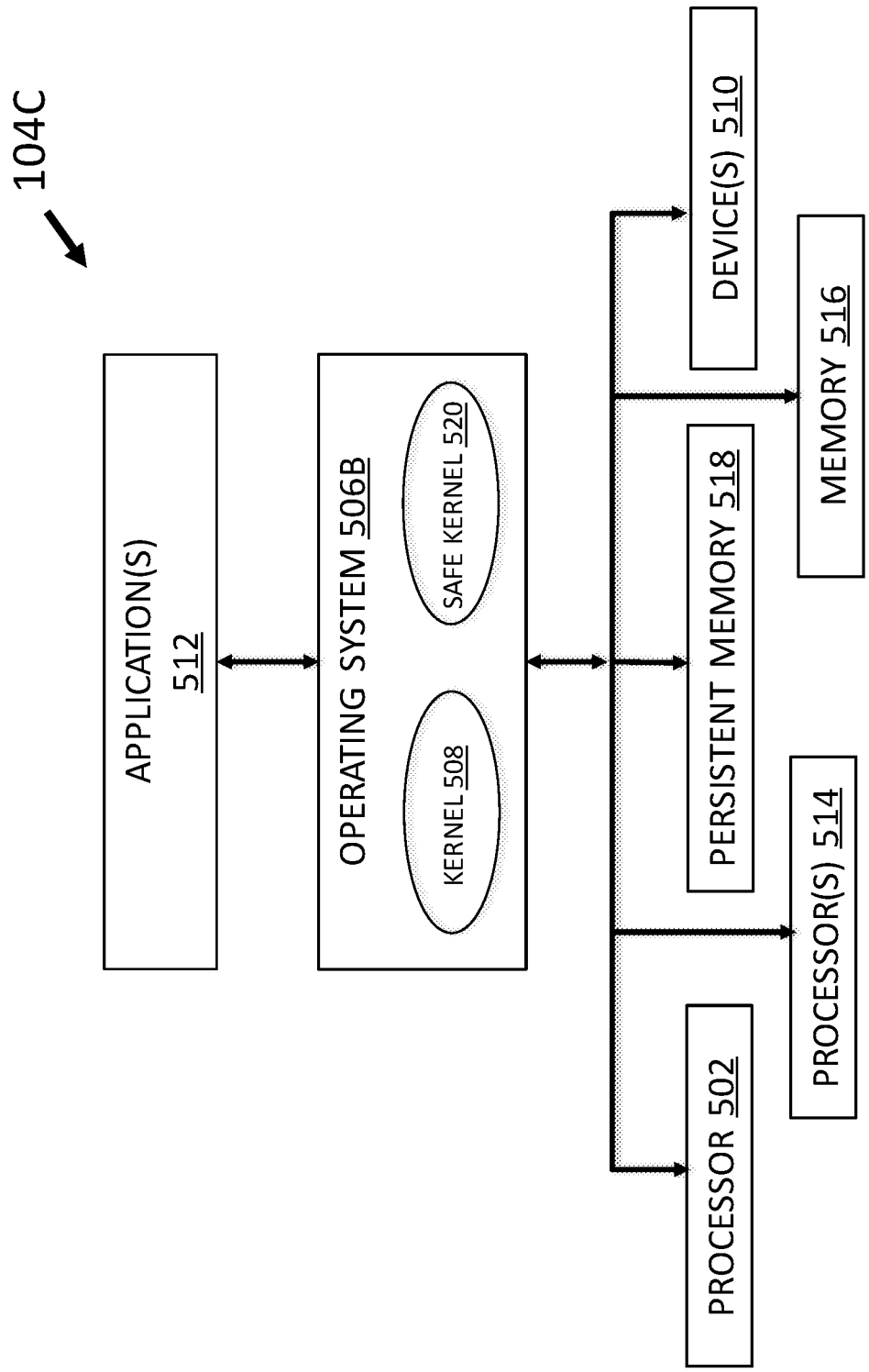

With reference to FIGS. 5A through 5C, FIGS. 5A through 5C are block diagrams illustrating various embodiments of a client device 104 that can receive a checkpoint image generated by a source computing system (e.g., computing system 200). Further, the client devices 104 illustrated in FIGS. 5A through 5C can boot and/or restore itself or themselves from the checkpoint image generated by the source computing system.

Referring to FIG. 5A, FIG. 5A is a block diagram of one embodiment of a client device 104A that can receive and boot and/or restore itself from a checkpoint image generated by the source computing system (e.g., computing system 200). In various embodiments, the client device 104A includes components and/or devices that correspond to components and/or devices in the computing system 200A.

At least in the illustrated embodiment, the client device 104A includes, among other components, a processor 502, a boot memory 504 including partitions 800A and 800B (see FIG. 8A), an operating system 506A including a kernel 508, a set of devices 510, a set of applications 512, a set of processors 514, a set of memory 516. In various embodiments, the processor 502, boot memory 504 including the partitions 800A and 800B, operating system 506A, kernel 508, device(s) 510, application(s) 512, processor(s) 514, and memory 516 of the client device 104A correspond to the processor 202, boot memory 204 including the partitions 400A and 400B, operating system 206A, kernel 208, device(s) 210, application(s) 212, processor(s) 214, and memory 216 of the computer system 200A.

With reference to FIG. 5B, FIG. 5B is a block diagram of one embodiment of a client device 104B that can receive and boot and/or restore itself from a checkpoint image generated by the source computing system (e.g., computing system 200). In various embodiments, the client device 104B includes components and/or devices that correspond to components and/or devices in the computing system 200B.

At least in the illustrated embodiment, the client device 104B includes, among other components, a processor 502, a persistent memory 518 including a partition 800C (see FIG. 8B), an operating system 506A including a kernel 508, a set of devices 510, a set of applications 512, a set of processors 514, and a set of memory 516. In various embodiments, the processor 502, persistent memory 518 including the partition 800C, operating system 506A, kernel 508, device(s) 510, application(s) 512, processor(s) 514, and memory 516 of the client device 104B correspond to the processor 202, persistent memory 218 including the partition 400C, operating system 206A, kernel 208, device(s) 210, application(s) 212, processor(s) 214, and memory 216 of the computer system 200B.

Referring to FIG. 5C, FIG. 5C is a block diagram of one embodiment of a client device 104C that can receive and boot and/or restore itself from a checkpoint image generated by the source computing system (e.g., computing system 200). In various embodiments, the client device 104C includes components and/or devices that correspond to components and/or devices in the computing system 200C.

At least in the illustrated embodiment, the client device 104C includes, among other components, a processor 502, a persistent memory 518, an operating system 506B including a kernel 508 and a safe kernel 520, a set of devices 510, a set of applications 512, a set of processors 514, and a set of memory 516. In various embodiments, the processor 502, persistent memory 518, operating system 506B, kernel 508, safe kernel 520, device(s) 510, application(s) 512, processor(s) 514, and memory 516 of the client device 104C correspond to the processor 202, persistent memory 218, operating system 206B, kernel 208, safe kernel 220, device(s) 210, application(s) 212, processor(s) 214, and memory 216 of the computer system 200C.

A processor 502 may include any suitable non-volatile/persistent hardware and/or software configured to read, write, and/or analyze data. In various embodiments, a processor 502 may include hardware and/or software that can perform boot operations, which may include a set of fast boot microcode load operations and/or a set of fast boot operations. In various embodiments, the set of fast boot microcode load operations and/or the set of fast boot operations are performed utilizing a checkpoint image generated by a computing system 200.

A processor 502 may further include hardware and/or software for executing instructions in one or more modules and/or applications that can receive a checkpoint image generated by a computing system 200, store the checkpoint image to a boot memory 504 and/or persistent memory 518, and boot a client device 104A, 104B, or 104C (also simply referred individually, in various groups, or collectively as client device(s) 104) utilizing the checkpoint image generated by a corresponding computing system 200A, 200B, or 200C. Specifically, a processor 502 can be configured to utilize a checkpoint image to boot a client device 104 (e.g., a target device) after a system upgrade and/or debug dump is performed on the client device 104. In some embodiments, booting a client device 104 utilizing a checkpoint image generated by a corresponding computer system 200 is a more efficient process and/or method in terms of an accelerated amount of time, among other efficiencies that are possible and contemplated herein.

Figure 6A:
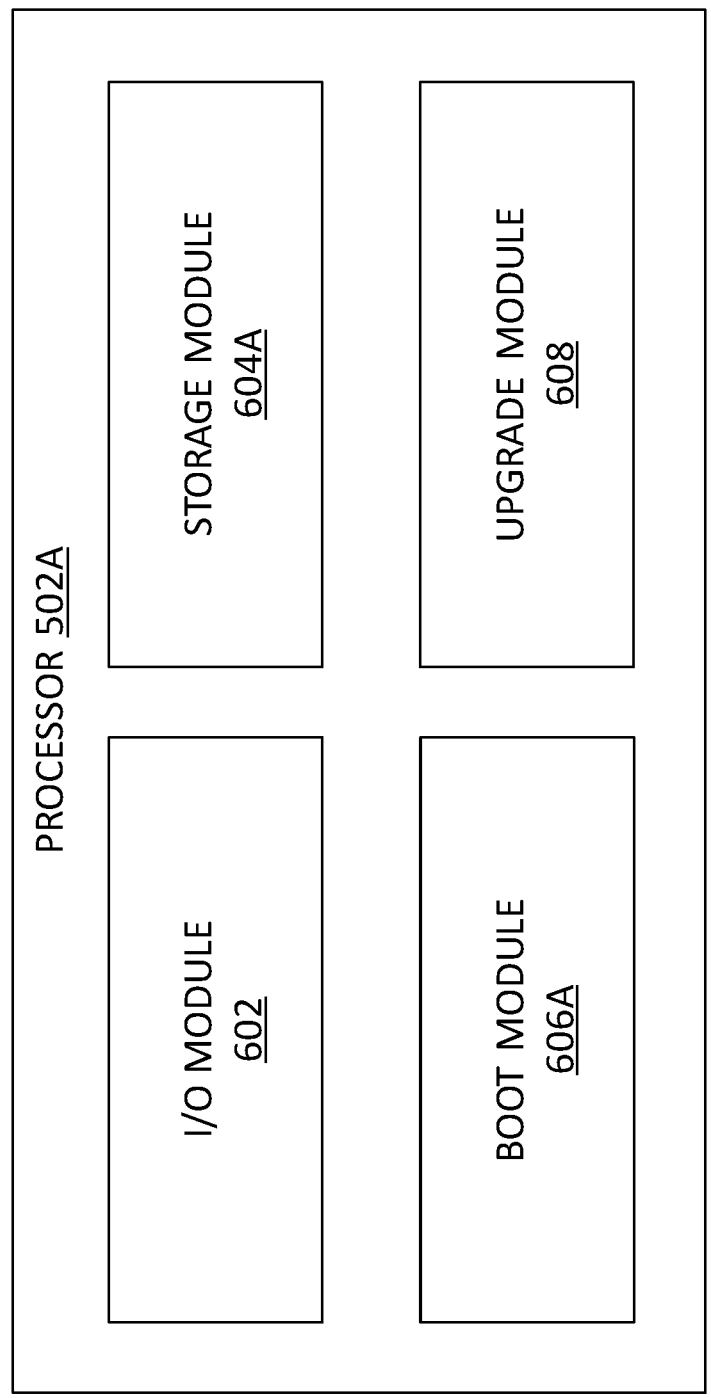
FIG. 6A is a block diagram of one embodiment of a processor included in the target computing device of FIG. 5A.

With reference to FIG. 6A, FIG. 6A is a block diagram of one embodiment of a processor 502A that can be included in a client device 104A. At least in the illustrated embodiment, a processor 502A includes, among other components, an input/output (I/O) module 602, a storage module 604A, a boot module 606A, and an upgrade module 608.

An I/O module 602 may include any suitable hardware and/or software that can communicate with a computing system 200. In various embodiments, the I/O module 602 is configured to receive a checkpoint image from a corresponding computing system 200 and transmit the received checkpoint image to a storage module 604.

A storage module 604A may include any suitable hardware and/or software that can store and/or save data to a boot memory 504. In various embodiments, the storage module 604A is configured to store a boot file 402A and/or a checkpoint image to a boot memory 504 (e.g., memory storing code for performing a boot process and/or sequence).

Figure 8A:
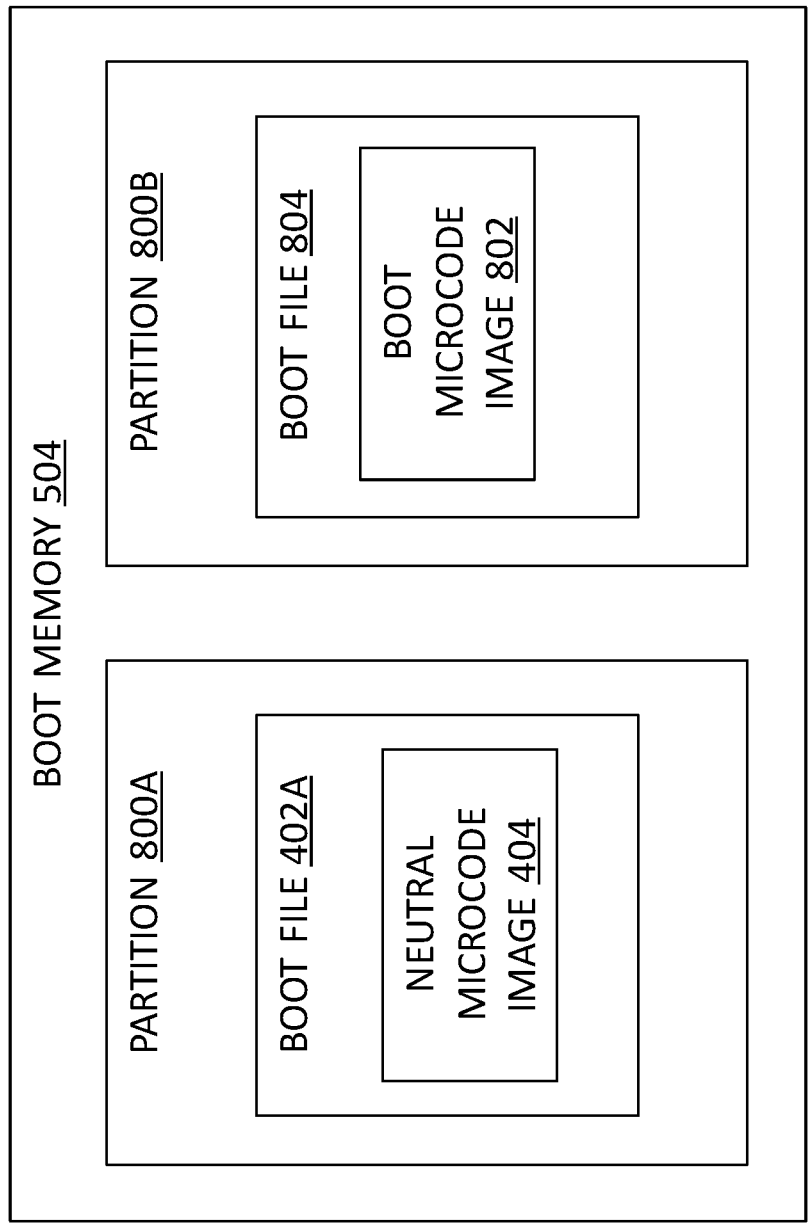
FIG. 8A is a block diagram of one embodiment of a boot memory included in the target computing device of FIG. 5A.

In some embodiments, a storage module 604A is configured to store a boot file 402A and/or a neutral microcode image 404 to a partition 800A (e.g., a region and/or section of storage space) in a boot memory 504 (see FIG. 8A). The neutral microcode image 404 can be read and/or loaded from the boot memory 504 by the processor 502A.

A boot module 606A may include any suitable hardware and/or software that can load a checkpoint image generated by a corresponding computing system 200 and boot a client device 104 from the loaded checkpoint image. In various embodiments, a boot module 606A is configured to load a checkpoint image from a boot memory 504 and allow an initialized kernel 508, initialized application(s) 512, and/or initialized thread(s) corresponding to the kernel 508, the application(s) 512, and/or the device(s) 510 to resume their respective operations from a checkpoint state (e.g., a stateless stage initialized state (neutral microcode image 404)).

Loading a checkpoint image and booting therefrom allows a client device 104 to skip and/or bypass one or more heavy/lengthy initialization tasks (e.g., memory allocation, memory initialization, and/or the creation of a set of objects), which enables the client device 104 to perform an efficient and/or fast boot process. In some embodiments, a fast boot and/or fast reboot process using a checkpoint image can be considered a hibernation and resume process (e.g., an operating system-level (OS-level) hibernate and resume process) for a kernel 508, a set of started applications 512, and/or a set of threads corresponding to the kernel 508, the application(s) 512, and/or one or more devices 510.

In additional or alternative embodiments, a boot procedure may include loading a checkpoint image to memory (e.g., boot memory) and instructing the kernel 508 to perform a shutdown call that stops each device 510 and passes control to a saved kernel context from the checkpoint image. The boot module 606A can then instruct the kernel 508 to initiate a resume procedure that allows the client device 104 to resume normal operations. At the completion of the resume procedure, all applications 512 are in stopped state and the checkpoint service that initiated the shutdown call in the prepared image resumes its flow. The checkpoint service resumes all stopped applications, which continue their initialization tasks that include creating and examining data structures on the memory 516 and initialization of the hardware contexts for the devices 510 that do not support hibernation.

In various embodiments, a boot module 606A can distinguish between reboot in which some regions of the memory 516 (e.g., persistent memory) are to be reset and code upgrades in which all of the regions in the memory 516 (e.g., persistent memory) remain intact. For example, during reboot, trace, logs and events data may not reset, while cache data for one or more applications 512 are reset.

An upgrade module 608 may include any suitable hardware and/or software that can upgrade data in a client device 104A. In various embodiments, an upgrade module 608 is configured to upgrade and/or modify a boot microcode image 802 stored on boot memory 504 (see FIG. 8A). In some embodiments, the boot microcode image 802 is stored in a boot file 804 on a partition 800B (e.g., a region and/or section of storage space) in the boot memory 504. As shown, the partition 800B storing the boot microcode image 802 and/or the boot file 804 is a separate and/or different partition than the partition 800A storing the neutral microcode image 404 (e.g., a checkpoint image) and/or the boot file 402A on the boot memory 504.

To upgrade a boot microcode image 802, the upgrade module 608 is configured to replace a previous boot microcode image 802 with a new and/or upgraded boot microcode image 802. In addition, the upgrade module 608 is further configured to instruct the kernel 508 to boot from the new/upgraded boot microcode image 802 on the next cold boot.

In some embodiments, the upgrade module 608 is configured to instruct a checkpoint image module 302 on a corresponding computing system 200 to generate and store a new checkpoint image (e.g., neutral microcode image 404) based on the new/upgraded boot microcode image 802. In further embodiments, the upgrade module 608 is further configured to instruct a boot module 606 (and/or a checkpoint module 702 and a system resume module 704 (see FIG. 7)) to perform a boot procedure utilizing the new checkpoint image (e.g., neutral microcode image 404) in accordance with the various boot procedures and/or hibernation/resume operations discussed elsewhere herein.

In various embodiments, in replacing a previous boot microcode image 802, the upgrade module 608 is configured to flush the previous boot microcode image 802 (and/or the boot file 804) from the boot memory 504 (and/or partition 800B) and utilize the new boot microcode image 802. In this manner, the upgrade module 608 may be configured to toggle between the roles of partitions 800A and 800B while the upgrade, boot, and subsequent cold boot operations are being performed.

Figure 6B:
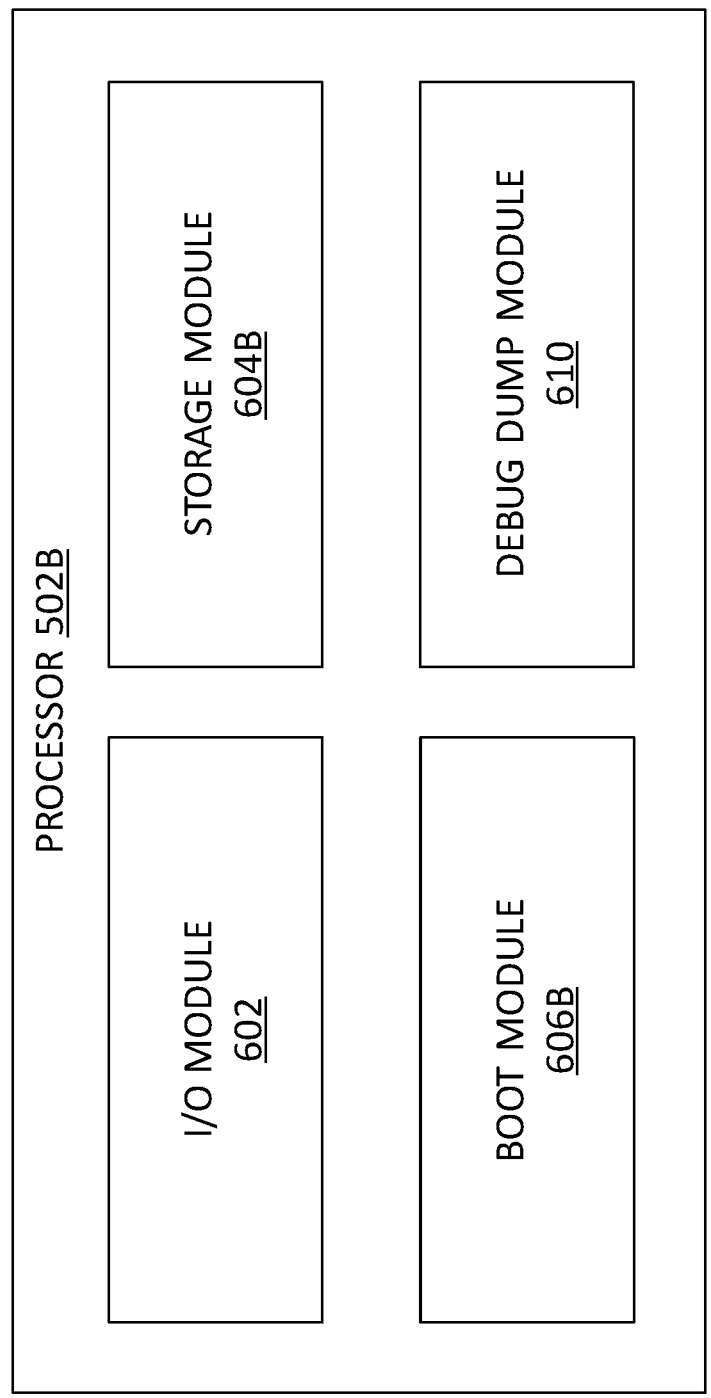
FIG. 6B is a block diagram of one embodiment of a processor included in the target computing devices of FIGS. 5B and 5C.

With reference to FIG. 6B, FIG. 6B is a block diagram of one embodiment of a processor 502B that can be included in a client device 104B or 104C. In various embodiments, the processor 502B includes an I/O module 602 similar to the I/O module 602 discussed with reference to FIG. 6A. At least in the illustrated embodiment, the processor 502B further includes, among other components a storage module 604B, a boot module 606B, and a debug dump module 610.

A storage module 604B may include any suitable hardware and/or software that can store and/or save data to a persistent memory 518. In various embodiments, the storage module 604B is configured to store a boot file 402B and/or a checkpoint image to a persistent memory 518 (e.g., a solid-state high-performance byte-addressable memory device).

Figure 8B:
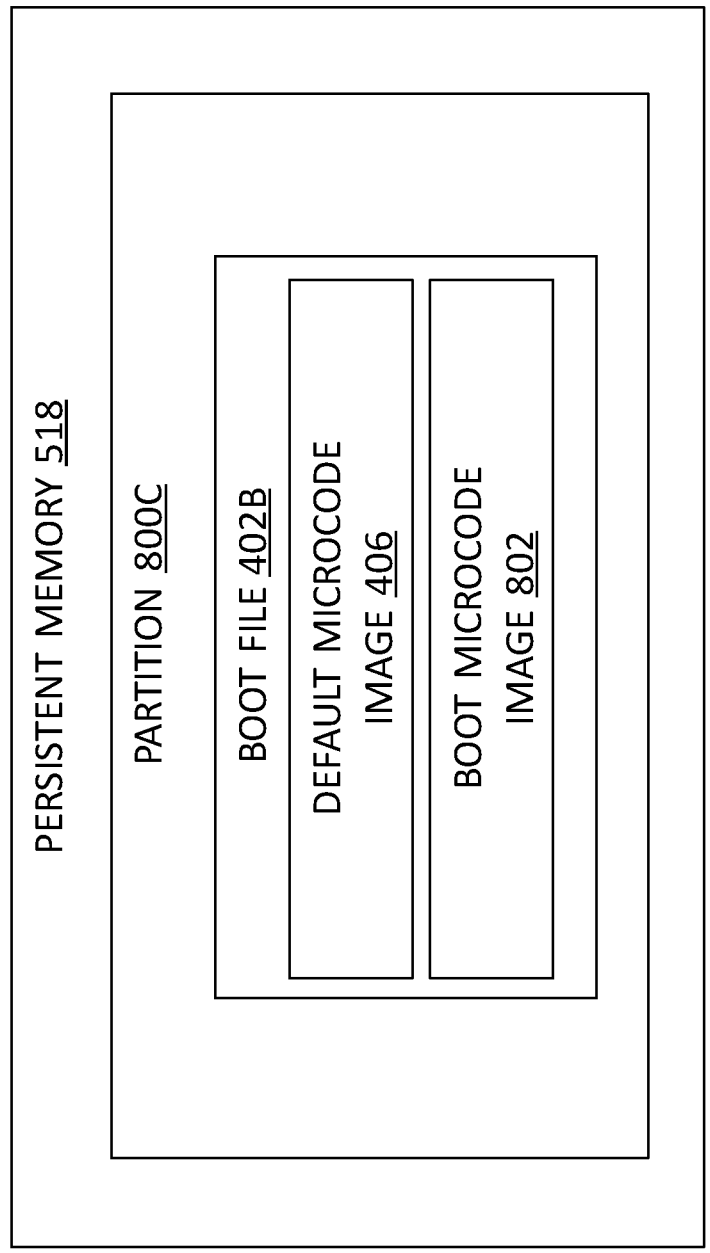
FIG. 8B is a block diagram of one embodiment of a persistent memory included in the target computing devices of FIGS. 5B and 5C.

In some embodiments, a storage module 604B is configured to store a boot file 402B and/or a default microcode image 406 to a partition 800C (e.g., a region and/or section of storage space) in a persistent memory 518 (see FIG. 8B). The default microcode image 406 can be read and/or loaded from the persistent memory 518 by a processor 502B.

A boot module 606B may include any suitable hardware and/or software that can load a checkpoint image generated by a corresponding computing system 200 and boot a client device 104 from the loaded checkpoint image. In various embodiments, a boot module 606B is configured to load a checkpoint image from a persistent memory 518 and allow an initialized kernel 508, initialized application(s) 512, and/or initialized thread(s) corresponding to the kernel 508, the application(s) 512, and/or the device(s) 510 to resume their respective operations from a stateful stage initialized state (default microcode image 406).

Loading a checkpoint image and booting therefrom allows a client device 104 to skip and/or bypass one or more heavy/lengthy initialization tasks (e.g., memory allocation, memory initialization, and/or the creation of a set of objects), which enables the client device 104 to perform an efficient and/or fast boot process. In some embodiments, a fast boot and/or fast reboot process using a checkpoint image can be considered a hibernation and resume process (e.g., an operating system-level (OS-level) hibernate and resume process) for a kernel 508, a set of started applications 512, and/or a set of threads corresponding to the kernel 508, the application(s) 512, and/or one or more devices 510.

In additional or alternative embodiments, a boot procedure may include loading a checkpoint image to memory (e.g., persistent memory 518) and instructing the kernel 508 to perform a shutdown call that stops each device 510 and passes control to a saved kernel context from the checkpoint image. The boot module 606B can then instruct the kernel 508 to initiate a resume procedure that allows the client device 104 to resume normal operations. At the completion of the resume procedure, all applications 512 are in stopped state and the checkpoint service that initiated the shutdown call in the prepared image resumes its flow. The checkpoint service resumes all stopped applications, which continue their initialization tasks that include creating and examining data structures on the memory 516 and initialization of the hardware contexts for the devices 510 that do not support hibernation.

In various embodiments, a boot module 606B can distinguish between reboot in which some regions of the memory 516 (e.g., persistent memory) are to be reset and code upgrades in which all of the regions in the memory 516 (e.g., persistent memory) remain intact. For example, during reboot, trace, logs and events data may not reset, while cache data for one or more applications 512 are reset.

A debug module 610 may include any suitable hardware and/or software that can perform a set of debug operations a client device 104. In various embodiments, a debug module 610 can perform a set of debug operations defining a debug dump procedure.

A debug dump procedure can include any suitable tasks and/or operations that can debug a client device 104B or 104C. In one embodiment, a debug module 610 is configured to instruct a boot module 606B and/or a checkpoint module 702 to create a "debug snapshot" procedure. To create a debug snapshot, a debug module 610 may request the boot module 606B to boot/load a safe kernel 520 to an operating system 506B (see FIG. 5C) and then request the checkpoint image module 302 in a corresponding computing system 200 to create and distribute to the client device 104B or 104C a checkpoint image with selected contents of the memory 516 so that the checkpoint image can be saved to a dump partition (e.g., a region and/or section of storage space) in the memory 516.

In additional embodiments, the debug module 310 is further configured to instruct the boot module 606B and/or a system resume module 704 to load the contents of the dump partition and restore the state of the kernel 508 and one or more applications 512. In this manner, the state of a client device 104B or 104C can be restored and debugged from a computing system 200.

In various embodiments, in response to performing a debug dump procedure, the debug module 610 is configured to flush the boot microcode image 802 and boot the client device 104B or 104C with the neutral microcode image 404. In this manner, the debug module 610 may be configured to perform a flush and boot procedure in the partition 800C while the debug dump operations are being performed.

Figure 7:
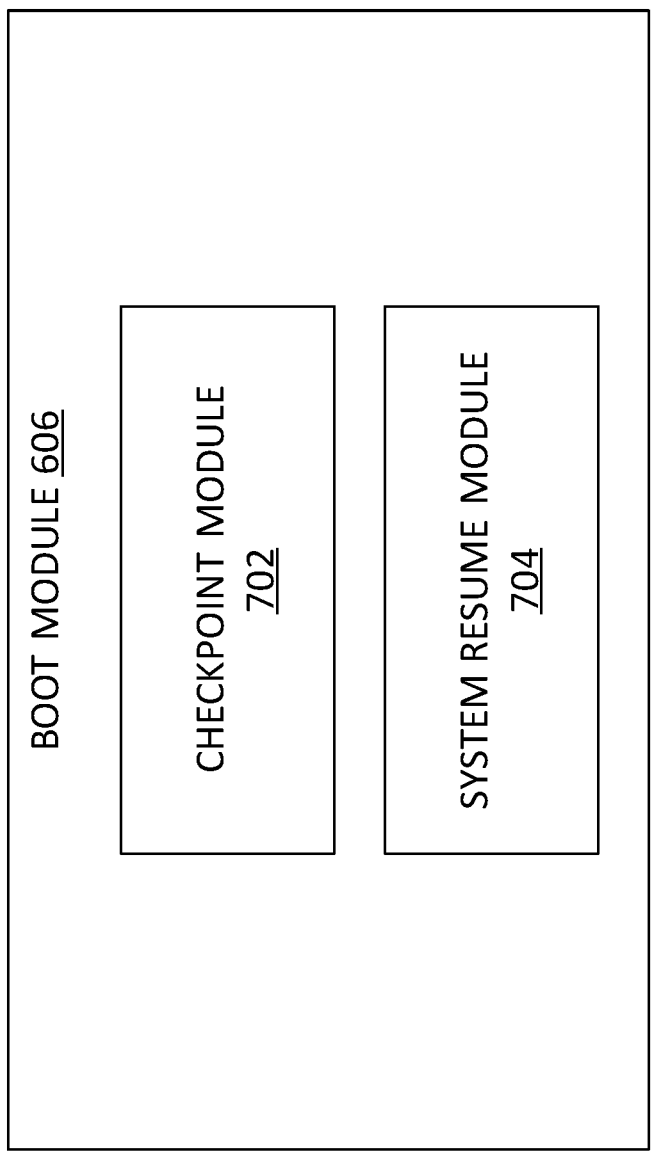
FIG. 7 is a block diagram of one embodiment of a boot module included in the processor of FIG. 6.

Referring to FIG. 7, FIG. 7 is a block diagram of one embodiment of a boot module 606 included in a processor 502. At least in the illustrated embodiment, a boot module 606 includes, among other components, a checkpoint module 702 and a system resume module 704.

A checkpoint module 702 may include any suitable hardware and/or software that can allow a client device 104 to enter a hibernating mode and/or a hybrid sleep mode, which is individually or collectively referred to herein as a hibernation mode. In various embodiments, a hibernation mode can include any set of processes that allows a client device 104 to enter a power-saving operating state or perform power-saving operations.

In some embodiments, a hibernation mode can include storing one or more open documents and/or programs to memory 516 and turning OFF the client device 104. In additional or alternative embodiments, a hibernation mode can include storing one or more open documents and/or programs to memory 516 and to a hard disk drive (not shown) and then operating the client device 104 in a low-power state and/or mode. Various other embodiments can include any suitable operations that can allows a client device 104 to enter an operating state that consumes less power than one or more other operating states for the client device 104.

A checkpoint module 702, in various embodiments, can cause a client device 104 to at least temporarily cease operating in a normal mode and/or in one or more power-consuming modes and begin operating in a hibernation mode. In some embodiments, a checkpoint module 402 can facilitate performing and/or cause an operating system 508 to perform a set of tasks defining a hibernation mode.

A hibernation mode may include any suitable set of tasks and/or operations that allow a client device 104 to consume less power and/or save power. Example tasks and/or operations that can define a hibernation mode can include, but are not limited to, 1) switching to a default processor 502 (e.g., a boot central processing unit (CPU) or CPU-0); 2) stopping each user-space thread and/or kernel thread that can modify the state of a file system; 3) calling a set of hibernation and/or hybrid sleep routines by each device 510 in the client device 104; 4) stopping each processor 514 on the client device 104 except the executing processor 502 (e.g., "other" processor(s) 514); 5) allocating a checkpoint image (e.g., for saving each active memory page not marked as free (excluding those that belong to the checkpoint image or to the areas of persistent memory that can be skipped from saving), adding a record of page tables to the checkpoint image, in addition to the record of the state of all other processors 514, and saving the state of the executing processor 502 prior to exiting from the hibernation routine); 6) resuming operations of the other processor(s) 514; 7) resuming the device(s) 510 in the client device 104 that write the checkpoint image therein; 8) saving the checkpoint image of the client device 104 to memory (e.g., boot memory 504 and/or persistent memory 518); and/or 9) powering OFF the client device 104 or the client device 104 entering a power-saving mode; etc., among other tasks and/or operations that can allow a client device 104 to consume less power and/or save power.

In various embodiments, calling a set of hibernation and/or hybrid sleep routines by each device 510 in the client device 104 (see example task/operation 3) can include any suitable hibernation and/or hybrid sleep operation(s). For example, at the end of normal operations and/or power-consuming operations, hibernation and/or hybrid sleep operations can include, but are not limited to, saving the checkpoint image to memory in the kernel 508, placing each device 510 in the client device 104 into a mode that will prevent modification of the kernel memory and/or generation of events upon completion of the operation, calling for each driver for the device(s) 510 that do not implement a hibernation routine, a set of default routines that save a generic and/or predetermined configuration (e.g., a Peripheral Component Interconnect (PCI) configuration and/or the like configuration, etc.) of the device(s) 510 and disable the associated device 510, calling a set of hibernation routines that allows the driver(s) for the device(s) 210 to save the state of the one or more devices 510 (e.g., all hardware contexts opened by applications 512 will be valid once the state is restored), including one or more objects that the started application(s) 512 have opened that have representation in the firmware of a device 510, as well as in the driver memory (e.g., queue pairs, completion queues, command queues, and/or response queues).

A system resume module 704 may include any suitable hardware and/or software that can allow a client device 104 to begin a resume mode. In various embodiments, a resume mode can include any set of processes and/or operations that allow a client device 104 to return to and/or resume normal operations, resume one or more power-consuming operations, and/or exit a hibernation mode.

A resume mode, in various embodiments, can include loading a checkpoint image and/or resuming one or more applications on a client device 104. In some embodiments, a resume mode includes a system resume module 704 performing and/or facilitating (e.g., via an operating system 506A (see FIGS. 5A and 5B) or an operating system 506B (see FIG. 5C), also simply referred individually, in various groups, or collectively as operating system(s) 506) the execution of one or more resume tasks and/or operations, (e.g., resume normal operations and/or power-consuming operations).

Example resume tasks/operations can include, but are not limited to, 1) loading and executing the kernel 508 of an operating system 506 for "normal" operations; 2) loading (e.g., from boot memory 504 and/or persistent memory 518) one or more drivers for reading the checkpoint image; 3) determining (e.g., by the kernel 508) that the checkpoint image in the boot memory 504 and/or persistent memory 518 is a valid checkpoint image; 4) switching the client device 104 to a default processor 502 (e.g., CPU-0); 5) stopping each user-space thread and each kernel thread that can modify the state of a file system in the client device 104; 6) stopping each other processor 514 except the executing processor 502; 7) reading the checkpoint image from a boot memory 504 and/or a persistent memory 518; 8) placing each device 510 on the client device 104 into a low power mode that will not and/or cannot modify kernel memory and/or emit events; 9) passing control to a kernel microcode image from the checkpoint image (e.g., the kernel 508 is loaded and executed and uses the checkpoint image to restore the kernel page tables and active memory 516; 10) restoring the state of one or more devices 510 on the client device 104 from the checkpoint image; 11) resuming one or more other processors 514; 12) restoring each memory (e.g., boot memory 504 and/or a persistent memory 518) from the checkpoint image; 13) restoring a boot processor (e.g., processor 502) to its operating state; and/or 14) resuming operations of the application(s) 512 that requested the hibernation mode; etc., among other resume tasks/operations that are possible and contemplated herein. In some embodiments, restoring the state of each hardware device 510 stored in the checkpoint image (see example task/operation 10) can include determining whether/that each driver for the device (s) 510 and its corresponding data structure(s) is/are present and valid and the kernel 508 calling the resume routines of each driver, which allows each driver to restore its previously saved state and may include restoration of the firmware and/or hardware state of the boot memory 504, a persistent memory 518, and/or device(s) 510. Since one or more drivers for the device(s) 510 may not implement a resume from hibernation routine, various embodiments can further and/or additionally include one or more default routines that can call and enable a generic and/or predetermined configuration (e.g., a PCI configuration and/or the like configuration, etc.) to re-enable the device(s) 510.

With reference to FIGS. 5A and 8A, a boot memory 504 may include any suitable type of device and/or system that is known or developed in the future that can store computer-usable data. In various embodiments, a boot memory 504 includes a storage device/system including a set of non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 502). In some embodiments, the boot memory 504 includes one or more hard drives or hard disk drives. In other embodiments, the boot memory 504 may be random access memory (RAM) that is transient with power loss, but will not reset during a reboot process controlled by the boot module 606.

A boot memory 504 may include any suitable size that can provide storage space for one or more boot files 402A, one or more checkpoint images (e.g., neutral microcode image (s) 404), one or more boot files 408, and/or one or more boot microcode images 802. Further, a boot memory 504 can store data in a set of data blocks, data segments, and/or data chunks including any suitable size that is known or developed in the future.

A boot memory 504, in various embodiments, may be configured to include a set of partitions, regions, and/or sections, which can include any suitable quantity of partitions, regions, and/or sections. As illustrated in FIG. 8A, a boot memory 504 can include two (2) partitions (e.g., partition 800A and partition 800B, also simply referred individually, in various groups, or collectively as partition(s) 800), among other quantities of partitions 800 that are greater than two partitions 800 and less than two partitions 800 (e.g., one (1) partition 800).

A partition 800A is configured to store one or more boot files 402A that can include/store one or more checkpoint images (e.g., neutral microcode image(s) 404), as discussed elsewhere herein. A partition 800B is configured to store one or more boot files 804 that can include/store one or more boot microcode images 802.

A boot file 804 may include any suitable type of file that can store/include computer-usable data. In various embodiments, a boot file 804 is configured to store/include one or more boot microcode images 802.

A boot microcode image 802 may include any suitable data that can be utilized to boot a client device 104. In various embodiments, a boot microcode image 802 may include any suitable boot data, boot process, boot method, and/or boot procedure that is known or developed in the future that can perform a cold boot on a client device 104.

Referring to FIGS. 5B, 5C, and 8B, a persistent memory 518 may include any suitable type of device and/or system that is known or developed in the future that can store computer-usable data. In various embodiments, a persistent memory 518 includes a storage device/system including a set of non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 502). In some embodiments, the persistent memory 518 includes one or more persistent RAM technologies (e.g., Intel Optane DC memory, etc.). In other embodiments, persistent memory 518 can include one or more hard drives or hard disk drives.

A persistent memory 518 may include any suitable size that can provide storage space for one or more boot files 402B, one or more checkpoint images (e.g., default microcode image(s) 406), and/or a boot microcode image 802. Further, a persistent memory 518 can store data in a set of data blocks, data segments, and/or data chunks including any suitable size that is known or developed in the future.

In various embodiments, a persistent memory 518 is configured to store data for a specific/particular device and/or system that is maintained and/or may never be deleted. Further, the data for the specific/particular device and/or system, in some embodiments, is excluded from the checkpoint image(s) generated by the checkpoint image module 302.

A persistent memory 518, in various embodiments, may be configured to include a set of partitions, regions, and/or sections, which can include any suitable quantity of partitions, regions, and/or sections. As illustrated in FIG. 8B, a persistent memory 518 can include one partition (e.g., partition 800C), among other quantities of partitions 800C that are greater than one partition 800C.

A partition 800C is configured to store one or more boot files 402B that can include/store one or more checkpoint images. At least in the illustrated embodiments, a boot file 402B is configured to store one or more default microcode image(s) 406 and/or a boot microcode image 802, as discussed elsewhere herein. In various embodiments, because persistent memory 518 may include a single partition 800C, during various operations (e.g., reboot, debug dump, etc.) the boot microcode image 802 may be flushed from the partition 800C and the client device 104 is booted utilizing a default microcode image 406 stored in the partition 800C.

With reference to FIGS. 5A and 5B, an operating system 506A may include any suitable hardware and/or software that can support a set of functions/operations for a client device 104. Example functions/operations can include, but are not limited to, scheduling tasks, executing applications, and/or controlling peripherals, etc., among other functions/operations that are possible and contemplated herein. As such, an operating system 206A may include any operating system that is known or developed in the future.

At least in the illustrated embodiment, an operating system 506A includes, among other components, a kernel 508 (and/or application(s) 512) configured to boot a client device 104. A kernel 508 may include any suitable hardware and/or software that can allocate resources, manage a set of files, and/or provide security for a client device 104, among other functions/operations that are possible and contemplated herein.

In various embodiments, a kernel 508 is configured to operate/function in conjunction with a processor 502 to perform and/or facilitate performing the various operations of the processor 502, as discussed herein. That is, a kernel 508 may be configured to perform and/or assist in performing one or more procedure, operations, and/or methods for booting a client device 104 from a checkpoint image (e.g., a neutral microcode image 404 and/or a default microcode image 406), as discussed elsewhere herein, among other boot operations that are possible and contemplated herein.

Referring to FIG. 5C, an operating system 506B may include a kernel 508 (and/or application(s) 512) similar to the various embodiments of a kernel 508 discussed elsewhere herein. An operating system 506B may further include, among other components, a safe kernel 520.

A safe kernel 520 may include any suitable hardware and/or software that can boot a client device 104 in a safe mode. In various embodiments, a safe kernel 520 is configured to perform and/or facilitate performing a debug dump process, as discussed elsewhere herein. That is, a safe kernel 520 can be configured to save a checkpoint image (e.g., a boot file 402B and/or a default microcode image 406) and/or selected contents of the memory 516 (e.g., persistent memory) to a dump partition in the memory 516, as discussed elsewhere herein.

With reference again to FIGS. 5A, 5B, and 5C, a set of devices 510 may include any suitable computing device and/or system that can operate and/or perform one or more functions within the client device 104. As such, a client device 104 may include any computing device/system that is known or developed in the future. Further, a set of devices 510 may include any suitable quantity of devices 510 that can facilitate the client device 104 performing its intended use.

A set of applications 512 may include any suitable computing application that can operate within the client device 104. As such, an application 512 may include any hardware and/or software that is known or developed in the future. Further, a set of applications 512 may include any suitable quantity of applications 512 that can facilitate the client device 104 and/or device(s) 510 performing their intended functions.

A set of processors 514 may include any suitable computer processing device that can operate within the client device 104. As such, a processor 514 may include any hardware and/or software that is known or developed in the future. Further, a set of processors 514 may include any suitable quantity of processors 514 that can facilitate the client device 104, device(s) 510, and/or application(s) 512 performing their intended functions.

A memory 516 may include any suitable type of device(s) and/or system(s) that is/are known or developed in the future that can store computer-usable data. In various embodiments, a memory 516 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 502 and/or processor(s) 514).

In some embodiments, a memory 516 may be implemented as a direct-access storage device (DASD). A memory 516, in further embodiments, may include other types of non-transitory memory such as, for example, flash memory (e.g., a solid-state devices (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) of memory devices (e.g., non-volatile and/or persistent), etc. that are possible and contemplated herein.

A memory 516 may include any suitable size that can provide storage space for one or more applications 512. A memory 516, in various embodiments, can include a size in the range of about 4 KB to about 100 TB, among other sizes that are possible and contemplated herein. In some embodiments, a memory 516 can include a size of about 1 TB, among other sizes that are possible and contemplated herein.

Figure 9:
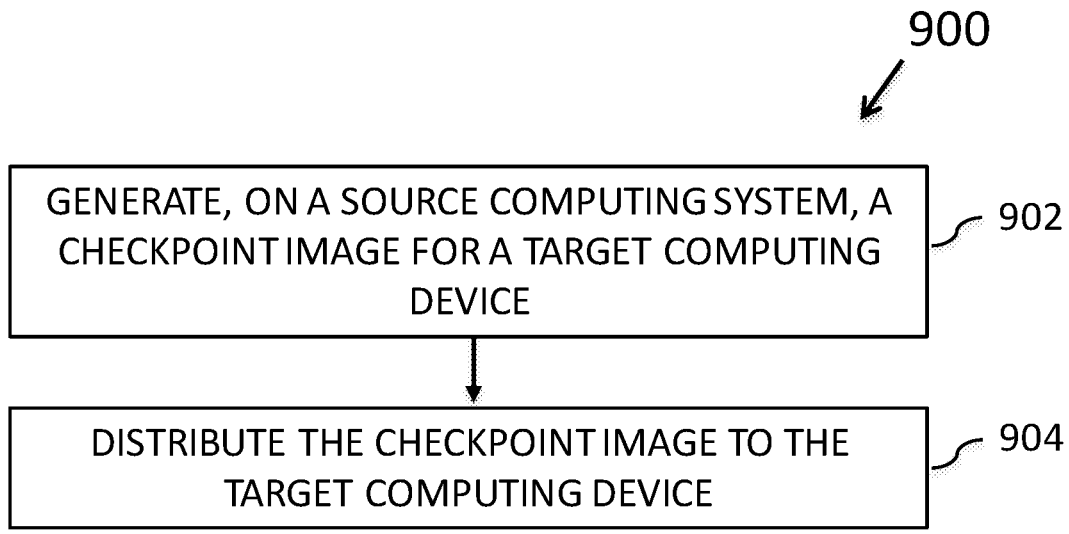
FIG. 9 is a schematic flow chart diagram illustrating one embodiment of a method for generating a checkpoint image for a target computing device on source computing system.

Referring to FIG. 9, FIG. 9 is a schematic flow chart diagram illustrating one embodiment of a method 900 for generating a checkpoint image for a target computing device (e.g., a client device 104A, 104B, or 104C) on source computing system (e.g., computing system 200A, 200B, or 200C). At least in the illustrated embodiment, the method 900 begins by a processor 202 in the source computing system generating a checkpoint image for a target computing device (block 902). The generated checkpoint image may be any default microcode image (e.g., default microcode image 406) or any neutral microcode image (e.g., default microcode image 404) for the target computing device discussed herein. Further, the default microcode image 406 or the neutral microcode image 404 may be generated utilizing any of the methods, processes, and/or techniques for generating a checkpoint image, a default microcode image 406, or a neutral microcode image 404 discussed herein.

The processor 202 further distributes and/or transfers the generated checkpoint image to the target computing device for storage therein (block 904). The processor 202 may distribute the generated checkpoint image using any method, process, and/or technique that can transmit the generated checkpoint image from the source computing system to the target computing device. Further, the target computing device can utilize the generated checkpoint image to boot and/or restore itself after performing a debug dump process and/or upgrading a boot microcode image, as discussed elsewhere herein.

Figure 10:
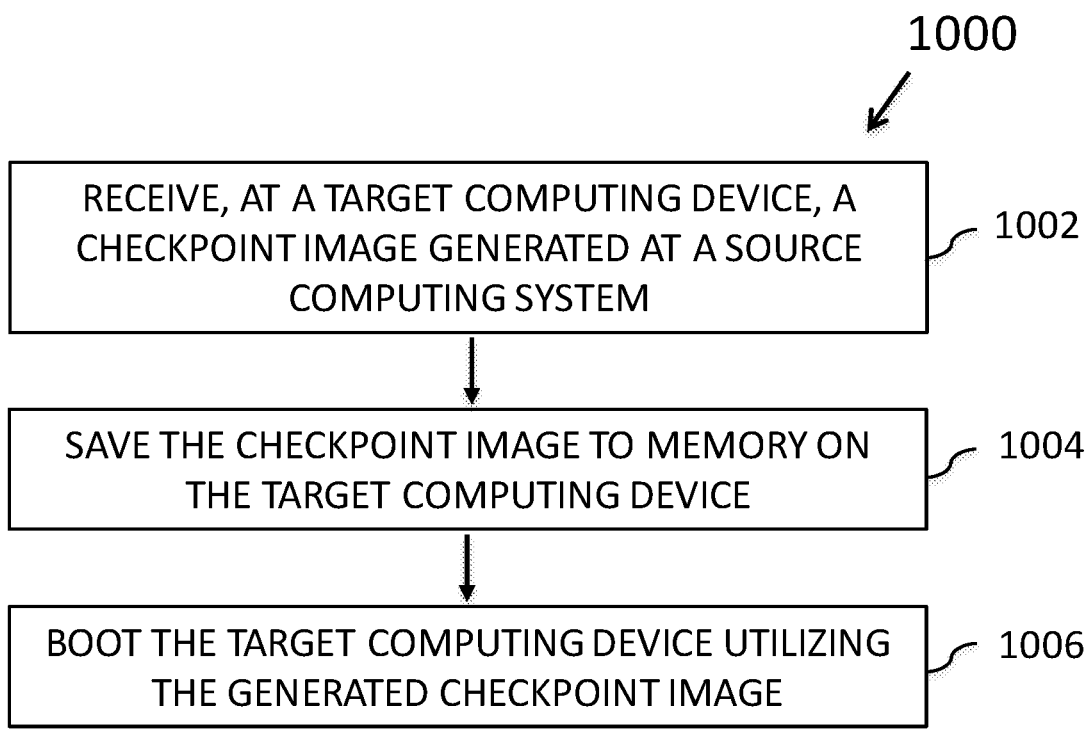
FIG. 10 is a schematic flow chart diagram illustrating one embodiment of a method for booting a target computing device from a checkpoint image generated at a source computing system.

With reference to FIG. 10, FIG. 10 is a schematic flow chart diagram illustrating one embodiment of a method 1000 for booting a target computing device (e.g., a client device 104A, 104B, or 104C) from a checkpoint image generated at a source computing system (e.g., computing system 200A, 200B, or 200C). At least in the illustrated embodiment, the method 1000 begins by a processor 502 of the target computing device receiving a checkpoint image generated at the source computing system (block 1002).

The processor 502 saves and/or stores the generated checkpoint image to memory on the target computing device (block 1004). In some embodiments, the generated checkpoint image is saved/stored in a boot memory 504. In other embodiments, the generated checkpoint image is saved/stored in a persistent memory 518. In further embodiments, the generated checkpoint image is saved/stored in the boot memory 504 and in the persistent memory 518.

In various embodiments, the processor 502 boots the target computing device utilizing the generated checkpoint image that is saved/stored in the memory of the target computing device (block 1006). The target computing device can be booted utilizing any of the methods, processes, and/or techniques for booting the target computing device utilizing a checkpoint image discussed herein.

Figure 11:
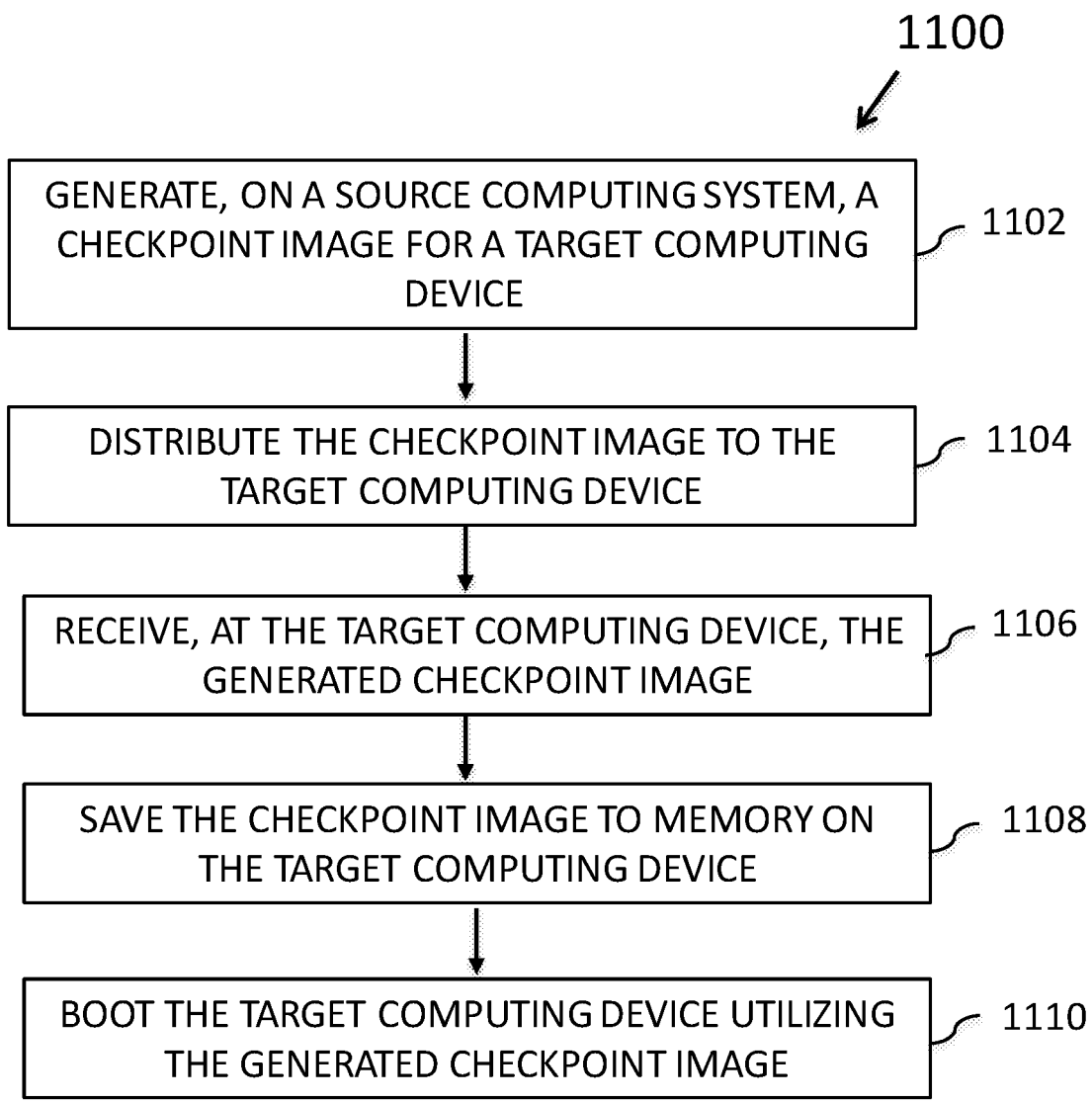
FIG. 11 is a schematic flow chart diagram illustrating another embodiment of a method for booting a target computing device from a checkpoint image generated at a source computing system.

Referring to FIG. 11, FIG. 11 is a schematic flow chart diagram illustrating another embodiment of a method 1100 for booting a target computing device (e.g., a client device 104A, 104B, or 104C) from a checkpoint image generated at a source computing system (e.g., computing system 200A, 200B, or 200C). At least in the illustrated embodiment, the method 1100 begins by a processor 202 in the source computing system generating a checkpoint image for a target computing device (block 1102). The generated checkpoint image may be any default microcode image (e.g., default microcode image 406) or any neutral microcode image (e.g., default microcode image 404) for the target computing device discussed herein. Further, the default microcode image 406 or the neutral microcode image 404 may be generated utilizing any of the methods, processes, and/or techniques for generating a checkpoint image, a default microcode image 406, or a neutral microcode image 404 discussed herein.

The processor 202 further distributes and/or transfers the generated checkpoint image to the target computing device for storage therein (block 1104). The processor 202 may distribute the generated checkpoint image using any method, process, and/or technique that can transmit the generated checkpoint image from the source computing system to a processor 502 on the target computing device.

The processor 502 can receive the generated checkpoint image (block 1106) and save and/or store the generated checkpoint image to memory on the target computing device (block 1108). In some embodiments, the generated checkpoint image is saved/stored in a boot memory 504. In other embodiments, the generated checkpoint image is saved/stored in a persistent memory 518. In further embodiments, the generated checkpoint image is saved/stored in the boot memory 504 and in the persistent memory 518.

In various embodiments, the processor 502 boots the target computing device utilizing the generated checkpoint image that is saved/stored in the memory of the target computing device (block 1110). The target computing device can be booted utilizing any of the methods, processes, and/or techniques for booting the target computing device utilizing a checkpoint image discussed herein.

Figure 12:
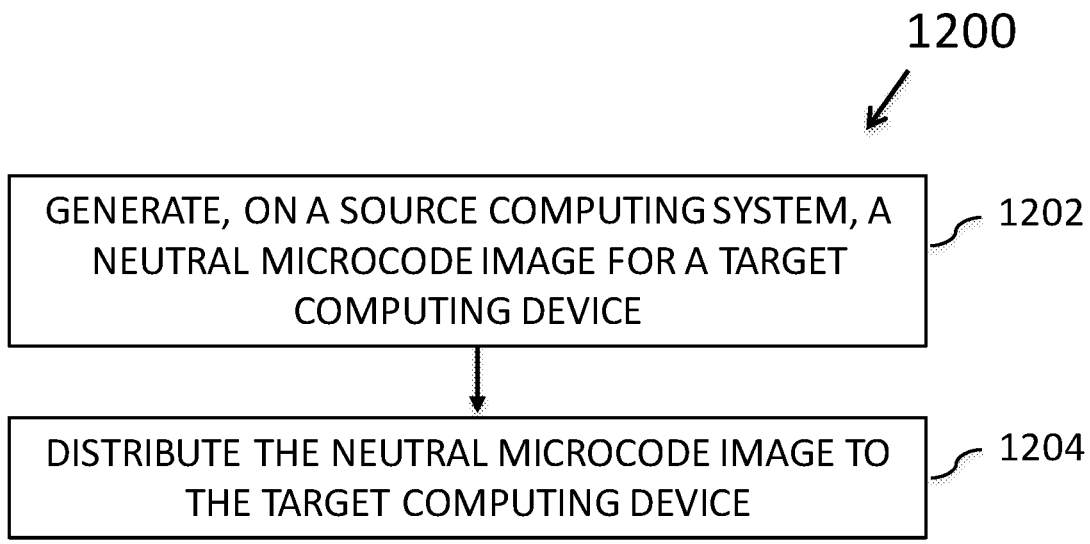
FIG. 12 is a schematic flow chart diagram illustrating one embodiment of a method for generating a neutral microcode image for a target computing device on source computing system.

Referring to FIG. 12, FIG. 12 is a schematic flow chart diagram illustrating one embodiment of a method 1200 for generating a neutral microcode image for a target computing device (e.g., a client device 104A) on source computing system (e.g., computing system 200A). At least in the illustrated embodiment, the method 1200 begins by a processor 202 in the source computing system generating a neutral microcode image for a target computing device (block 1202). The generated neutral microcode image can include the neutral microcode image 404 and/or a checkpoint image for the client device 104A discussed herein. Further, the neutral microcode image 404 and/or checkpoint image can be generated utilizing any of the methods, processes, and/or techniques for generating a neutral microcode image 404 and/or a checkpoint image discussed herein.

The processor 202 further distributes and/or transfers the generated neutral microcode image to the target computing device for storage therein (block 1204). The processor 202 may distribute the generated neutral microcode image using any method, process, and/or technique that can transmit the generated neutral microcode image from the source computing system to a processor 502A on the target computing device.

Figure 13:
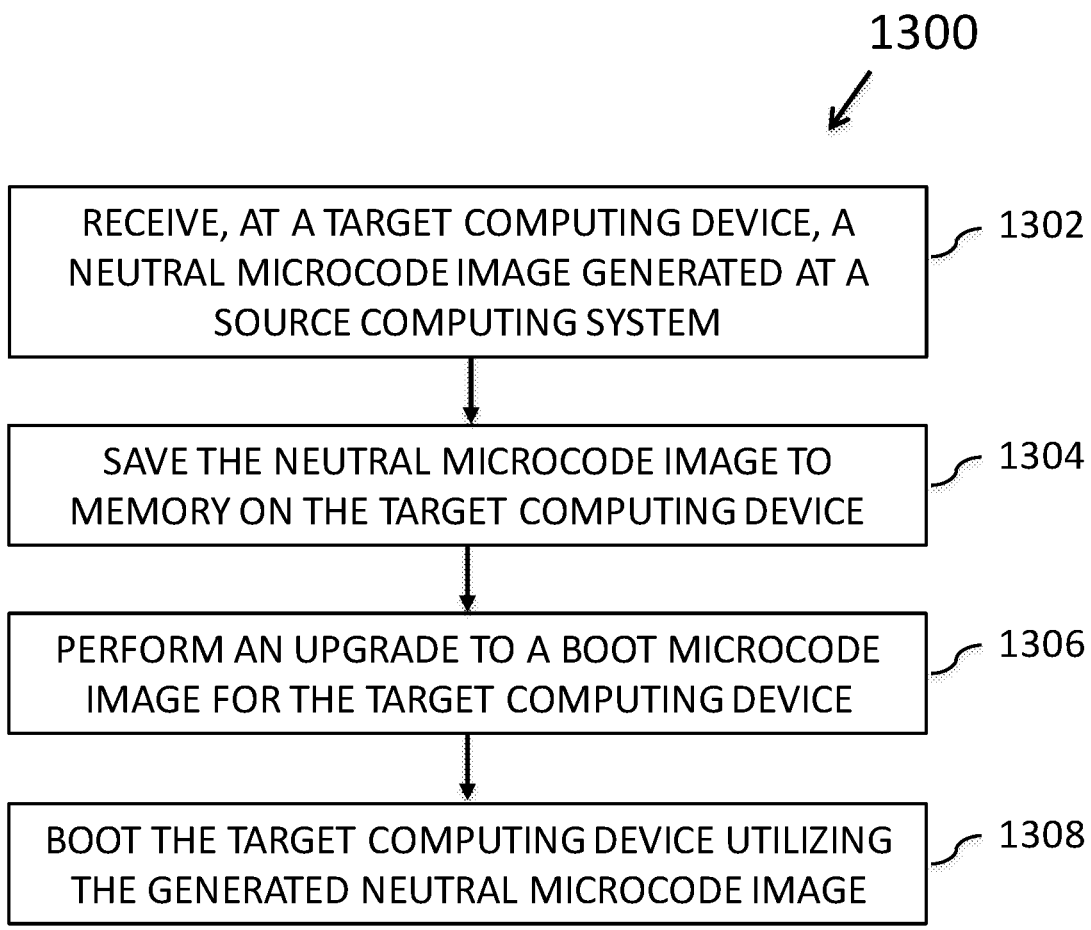
FIG. 13 is a schematic flow chart diagram illustrating one embodiment of a method for booting a target computing device from a neutral microcode image generated at a source computing system.

With reference to FIG. 13, FIG. 13 is a schematic flow chart diagram illustrating one embodiment of a method 1300 for booting a target computing device (e.g., a client device 104A) from a neutral microcode image generated at a source computing system (e.g., computing system 200A). At least in the illustrated embodiment, the method 1300 begins by a processor 502B of the target computing device receiving a neutral microcode image generated at the source computing system (block 1302).

The processor 502A can save and/or store the generated neutral microcode image to memory on the target computing device (block 1304). In some embodiments, the generated neutral microcode image is saved/stored in a boot memory 504. In further embodiments, the generated neutral microcode image is saved/stored in a partition (e.g., partition 800A) of the boot memory 504. In still further embodiments, the generated neutral microcode image is saved/stored as at least a portion of a boot file (e.g., a boot file 402A) in the partition 800A of the boot memory 504.

The processor 502A may then upgrade a boot microcode image (e.g., a boot microcode image 802) on the target computing device (block 1306). The boot microcode image can be upgraded using any boot upgrade process, algorithm, and/or technique discussed herein. In some embodiments, the upgraded boot microcode image 802 can be saved and/or stored in a boot memory 504 as discussed herein. In further embodiments, the upgraded boot microcode image 802 can be saved and/or stored in a partition 800B of the boot memory 504 as discussed herein. In still further embodiments, the upgraded boot microcode image 802 can be saved and/or stored to a boot file 804 in the partition 800B of the boot memory 504 as discussed herein.

In response to performing the boot microcode image upgrade, the processor 502B boots the target computing device utilizing the generated neutral microcode image (block 1308). The target computing device may be booted utilizing any of the methods, processes, and/or techniques for booting the target computing device utilizing a neutral microcode image (e.g., neutral microcode image 404) for the client device 104A discussed herein.

Figure 14:
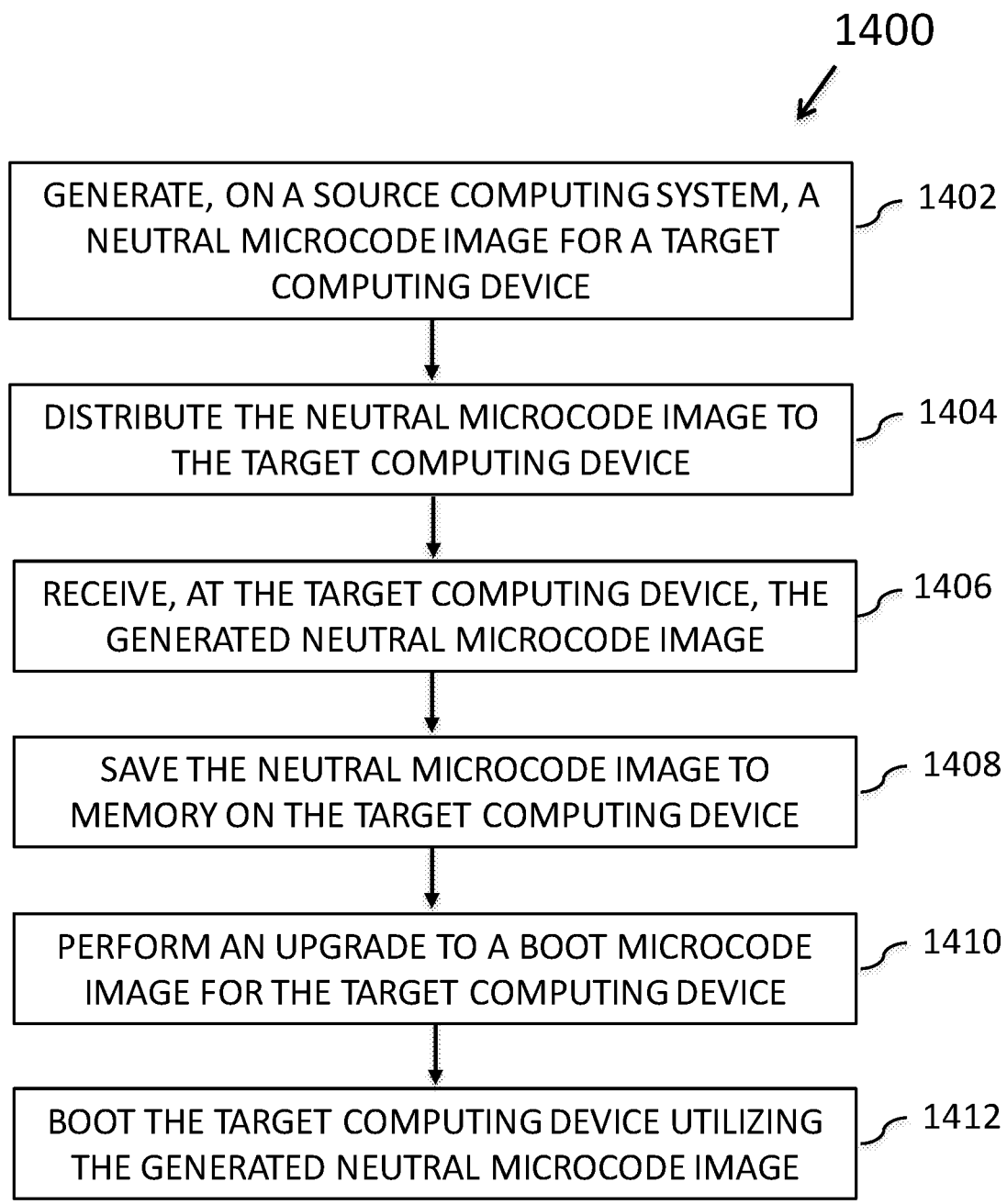
FIG. 14 is a schematic flow chart diagram illustrating another embodiment of a method for booting a target computing device from a neutral microcode image generated at a source computing system.

Referring to FIG. 14, FIG. 14 is a schematic flow chart diagram illustrating another embodiment of a method 1400 for booting a target computing device (e.g., a client device 104A) from a neutral microcode image generated at a source computing system (e.g., computing system 200A). At least in the illustrated embodiment, the method 1400 begins by a processor 202 in the source computing system generating a neutral microcode image for a target computing device (block 1402). The generated neutral microcode image can include the neutral microcode image 404 and/or a checkpoint image for the client device 104A discussed herein. Further, the neutral microcode image 404 and/or checkpoint image can be generated utilizing any of the methods, processes, and/or techniques for generating a neutral microcode image 404 and/or a checkpoint image discussed herein.

The processor 202 further distributes and/or transfers the generated neutral microcode image to the target computing device for storage therein (block 1404). The processor 202 may distribute the generated neutral microcode image using any method, process, and/or technique that can transmit the generated neutral microcode image from the source computing system to a processor 502A on the target computing device.

The processor 502A can receive the generated neutral microcode image (block 1406) and can save and/or store the generated neutral microcode image to memory on the target computing device (block 1408). In some embodiments, the generated neutral microcode image is saved/stored in a boot memory 504. In further embodiments, the generated neutral microcode image is saved/stored in a partition (e.g., partition 800A) of the boot memory 504. In still further embodiments, the generated neutral microcode image is saved/stored as at least a portion of a boot file (e.g., a boot file 402A) in the partition 800A of the boot memory 504.

The processor 502A may then upgrade a boot microcode image (e.g., a boot microcode image 802) on the target computing device (block 1410). The boot microcode image can be upgraded using any boot upgrade process, algorithm, and/or technique discussed herein. In some embodiments, the upgraded boot microcode image 802 can be saved and/or stored in a boot memory 504 as discussed herein. In further embodiments, the upgraded boot microcode image 802 can be saved and/or stored in a partition 800B of the boot memory 504 as discussed herein. In still further embodiments, the upgraded boot microcode image 802 can be saved and/or stored to a boot file 804 in the partition 800B of the boot memory 504 as discussed herein.

In response to performing the boot microcode image upgrade, the processor 502A boots the target computing device utilizing the generated neutral microcode image (block 1412). The target computing device may be booted utilizing any of the methods, processes, and/or techniques for booting the target computing device utilizing a neutral microcode image (e.g., neutral microcode image 404) for the client device 104A discussed herein.

Figure 15:
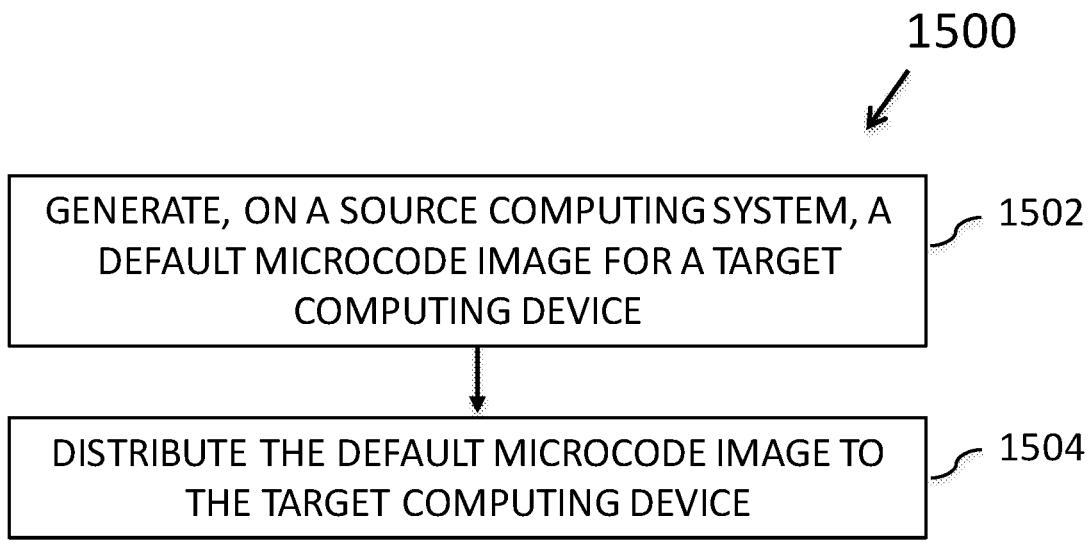
FIG. 15 is a schematic flow chart diagram illustrating one embodiment of a method for generating a default microcode image for a target computing device on source computing system.

With reference to FIG. 15, FIG. 15 is a schematic flow chart diagram illustrating one embodiment of a method 1500 for generating a default microcode image for a target computing device (e.g., a client device 104B or 104C) on source computing system (e.g., computing system 200B or 200C). At least in the illustrated embodiment, the method 1500 begins by a processor 202 in the source computing system generating a default microcode image for a target computing device (block 1502). The generated default microcode image can include a default microcode image 406 and/or a checkpoint image for the client device 104B and/or the client device 104C discussed herein. Further, the default microcode image 406 and/or checkpoint image can be generated utilizing any of the methods, processes, and/or techniques for generating a default microcode image 406 and/or a checkpoint image discussed herein.

The processor 202 further distributes and/or transfers the generated default microcode image to the target computing device for storage therein (block 1504). The processor 202 may distribute the generated default microcode image using any method, process, and/or technique that can transmit the generated default microcode image from the source computing system to a processor (e.g., processor 502A or processor 502B) on the target computing device.

Figure 16:
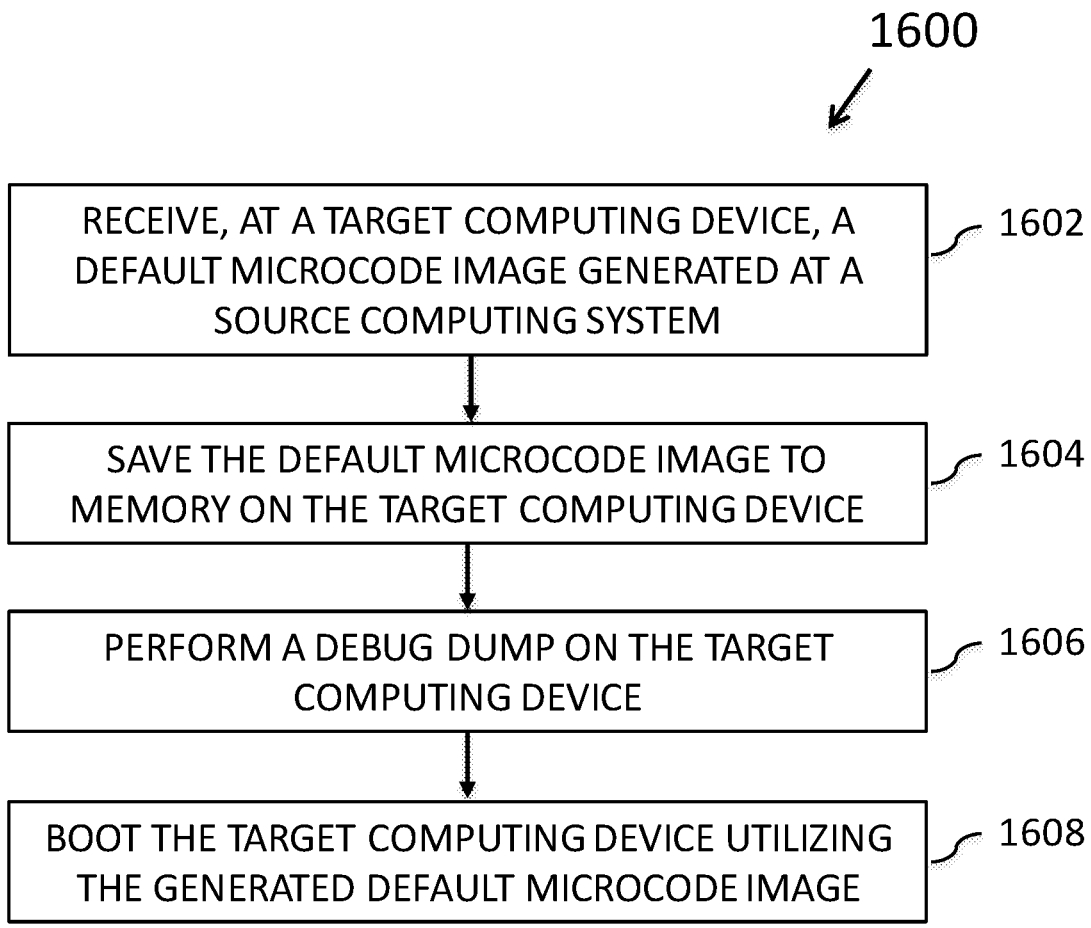
FIG. 16 is a schematic flow chart diagram illustrating one embodiment of a method for booting a target computing device from a default microcode image generated at a source computing system.

With reference to FIG. 16, FIG. 16 is a schematic flow chart diagram illustrating one embodiment of a method 1600 for booting a target computing device (e.g., a client device 104B or 104C) from a default microcode image generated at a source computing system (e.g., computing system 200B or 200C). At least in the illustrated embodiment, the method 1600 begins by a processor 502B of the target computing device receiving a default microcode image generated at the source computing system (block 1602).

The processor 502B can save and/or store the generated default microcode image to memory on the target computing device (block 1604). In some embodiments, the generated default microcode image is saved/stored in a persistent memory 518 as discussed herein. In further embodiments, the generated default microcode image is saved/stored in a partition (e.g., partition 800C) of the persistent memory 518 as discussed herein. In still further embodiments, the generated default microcode image is saved/stored as at least a portion of a boot file (e.g., a boot file 402B) in the partition 800C of the persistent memory 518 as discussed herein. In addition, the boot file 402B in the partition 800C of the persistent memory 518 can further include and/or store a boot microcode image 802, as discussed elsewhere herein.

The processor 502B may then perform a debug dump on the target computing device (block 1606). The debug dump can be any debug dump that is discussed herein, which can include any suitable debug dump process, algorithm, and/or technique that is known or developed in the future. For example, the debug dump may include creation of a current checkpoint image for the client device 104B and/or the client device 104C discussed herein.

In response to performing the debug dump, the processor 502B boots the target computing device utilizing the generated default microcode image (block 1608). The target computing device may be booted by the processor 502B utilizing any of the methods, processes, and/or techniques for booting the client devices 104B and 104C utilizing a default microcode image (e.g., default microcode image 406) for the client devices 104B and 104C discussed herein.

Figure 17:
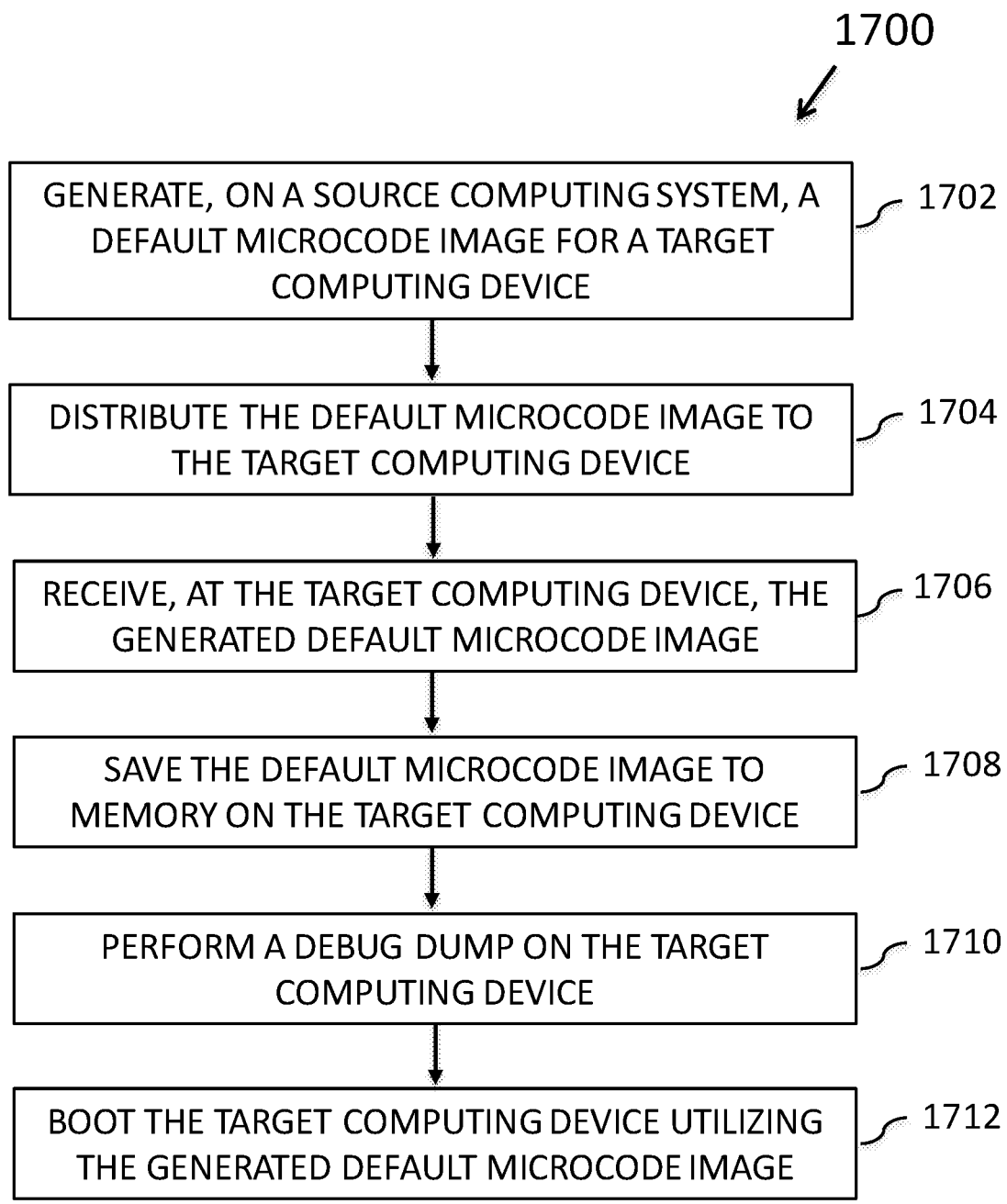
FIG. 17 is a schematic flow chart diagram illustrating another embodiment of a method for booting a target computing device from a default microcode image generated at a source computing system.

With reference to FIG. 17, FIG. 17 is a schematic flow chart diagram illustrating another embodiment of a method 1700 for booting a target computing device (e.g., a client device 104B or 104C) from a default microcode image generated at a source computing system (e.g., computing system 200B or 200C). At least in the illustrated embodiment, the method 1700 begins by a processor 202 in the source computing system generating a default microcode image for a target computing device (block 1702). The generated default microcode image can include a default microcode image 406 and/or a checkpoint image for the client device 104B and/or the client device 104C discussed herein. Further, the default microcode image 406 and/or checkpoint image can be generated utilizing any of the methods, processes, and/or techniques for generating a default microcode image 406 and/or a checkpoint image discussed herein.

The processor 202 further distributes and/or transfers the generated default microcode image to the target computing device for storage therein (block 1704). The processor 202 may distribute the generated default microcode image using any method, process, and/or technique that can transmit the generated default microcode image from the source computing system to a processor (e.g., processor 502B or processor 502C) on the target computing device.

The processor 502B can receive the generated neutral microcode image (block 1706) and can save and/or store the generated default microcode image to memory on the target computing device (block 1708). In some embodiments, the generated default microcode image is saved/stored in a persistent memory 518 as discussed herein. In further embodiments, the generated default microcode image is saved/stored in a partition (e.g., partition 800C) of the persistent memory 518 as discussed herein. In still further embodiments, the generated default microcode image is saved/stored as at least a portion of a boot file (e.g., a boot file 402B) in the partition 800C of the persistent memory 518 as discussed herein. In addition, the boot file 402B in the partition 800C of the persistent memory 518 can further include and/or store a boot microcode image 802, as discussed elsewhere herein.

The processor 502B may then perform a debug dump on the target computing device (block 1710). The debug dump can be any debug dump that is discussed herein, which can include any suitable debug dump process, algorithm, and/or technique that is known or developed in the future. For example, the debug dump may include creation of a current checkpoint image for the client device 104B and/or the client device 104C discussed herein.

In response to performing the debug dump, the processor 502B boots the target computing device utilizing the generated default microcode image (block 1712). The target computing device may be booted by the processor 502B utilizing any of the methods, processes, and/or techniques for booting the client devices 104B and 104C utilizing a default microcode image (e.g., default microcode image 406) for the client devices 104B and 104C discussed herein.

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. A system, comprising:
a checkpoint image module that generates a checkpoint image for a target computing device including a kernel, the checkpoint image comprises a neutral microcode image including a first stateless stage for the kernel; and
a distribution module that transmits the checkpoint image from the source computing system to the target computing device,
wherein:
the checkpoint image is generated and stored on a source computing system,
the checkpoint image is configured to enable the target computing device to perform a fast boot process by the target computing device loading the checkpoint image and booting the kernel from the first stateless stage included in the neutral microcode image while skipping performance of one or more lengthy initialization tasks,
the first stateless stage includes a first execution path that is executed when booting the kernel without depending on a current state and previous state of the kernel, and
at least a portion of said modules comprise one or more of a set of hardware circuits, a set of programmable hardware devices, and executable code stored on a set of non-transitory computer-readable storage media.

2. The system of claim 1, wherein:
the neutral microcode image further comprises a second stateless stage for a set of applications in the target computing device; and
the second stateless stage includes a second execution path that is executed when booting the set of applications without depending on a current state or a previous state of each respective application.

3. The system of claim 2, wherein the checkpoint image further comprises a default microcode image of a predetermined initialized state and stopped state for the kernel and the set of applications.

4. The system of claim 3, wherein the default microcode image is configured to boot the kernel and the set of applications in response to one of a debug dump being performed on the target computing device or upgrading a boot microcode image for the target computing device.

5. The system of claim 1, wherein the checkpoint image further comprises a default microcode image of a predetermined initialized state and stopped state for the kernel.

6. The system of claim 5, wherein the default microcode image is configured to boot the kernel in response to one of a debug dump being performed on the target computing device or upgrading a boot microcode image for the target computing device.

7. The system of claim 1, wherein the checkpoint image is further configured to boot at least the kernel from the neutral microcode image in response to one of a debug dump being performed in the target computing device or upgrading a boot microcode image for the target computing device.

8. A method, comprising:
generating, by a processor on a source computing system, a checkpoint image for a target computing device including a kernel, the checkpoint image comprises a neutral microcode image including a first stateless stage for the kernel; and
distributing the checkpoint image from the source computing system to the target computing device,
wherein:
the checkpoint image is stored on the source computing system,
the checkpoint image is configured to enable the target computing device to perform a fast boot process by the target computing device loading the checkpoint image and booting the kernel from the first stateless stage included in the neutral microcode image while skipping performance of one or more lengthy initialization tasks,
the first stateless stage includes a first execution path that is executed when booting the kernel without depending on a current state and previous state of the kernel, and
the source computing system and the target computing device are separate computing entities.

9. The method of claim 8, wherein:
the neutral microcode further comprises a second stateless stage for a set of applications in the target computing device; and
the second stateless stage includes a second execution path that is executed when booting the set of applications without depending on a current state or a previous state of each respective application.

10. The method of claim 9, wherein generating the checkpoint image further comprises generating a default microcode image of a predetermined initialized state and stopped state for the kernel and the set of applications.

11. The method of claim 10, further comprising booting the kernel and the set of applications utilizing the default microcode image in response to the target computing device one of performing a debug dump on the target computing device or upgrading a boot microcode image for the target computing device.

12. The method of claim 8, wherein:
the checkpoint image further comprises a default microcode image of a predetermined initialized state and stopped state for the kernel.

13. The method of claim 12, further comprising booting the kernel utilizing the default microcode image in response to one of a debug dump being performed on the target computing device or providing an upgrade to a boot microcode image for the target computing device.

14. The method of claim 8, wherein the checkpoint image is further configured to boot at least the kernel from the neutral microcode image in response to one of a debug dump being performed on the target computing device or upgrading a boot microcode image for the target computing device.

15. A computer program product comprising a computer-readable storage medium including program instructions embodied therewith, the program instructions executable by a processor to cause the processor to:
generate, on a source computing system, a checkpoint image for a target computing device including a kernel, the checkpoint image comprises a neutral microcode image including a first stateless stage for the kernel; and
distribute the checkpoint image from the source computing system to the target computing device,
wherein:
the checkpoint image is stored on the source computing system,
the checkpoint image is configured to enable the target computing device to perform a fast boot process by the target computing device loading the checkpoint image and booting the kernel from the first stateless stage included in the neutral microcode image while skipping performance of one or more lengthy initialization tasks,
the first stateless stage includes a first execution path that is executed when booting the kernel without depending on a current state and previous state of the kernel, and
the source computing system and the target computing device are separate computing entities.

16. The computer program product of claim 15, wherein:
the neutral microcode further comprises a second stateless stage for a set of applications in the target computing device; and
the second stateless stage includes a second execution path that is executed when booting the set of applications without depending on a current state or a previous state of each respective application.

17. The computer program product of claim 16, wherein generating the checkpoint image comprises:
generating a default microcode image of a predetermined initialized state and stopped state for the kernel and the set of applications.

18. The computer program product of claim 17, wherein:
the program instructions further cause the processor to boot the kernel and the set of applications utilizing the default microcode image in response to the target computing device one of performing a debug dump on the target computing device or upgrading a boot microcode image for the target computing device.

19. The computer program product of claim 16, wherein generating the checkpoint image comprises:
generating a default microcode image of a predetermined initialized state and stopped state for the kernel; and
the program instructions further cause the processor to boot the kernel utilizing the default microcode image in response to one of a debug dump being performed on the target computing device or upgrading a boot microcode image for the target computing device.

20. The computer program product of claim 15, wherein the checkpoint image is further configured to boot at least the kernel from the neutral microcode image in response to one of a debug dump being performed on the target computing device or upgrading a boot microcode image for the target computing device.

* * * * *